(12) United States Patent
Padgett et al.

(10) Patent No.: US 9,074,984 B2
(45) Date of Patent: Jul. 7, 2015

(54) AIRPORT SECURITY SCREENING SYSTEM AND METHOD

(71) Applicant: DISNEY ENTERPRISES, INC., Burbank, CA (US)

(72) Inventors: John M. Padgett, Clermont, FL (US); Michelle G. Bentubo, Orlando, FL (US); Harold J. Kennedy, Orlando, FL (US); Seth T. Abbe, Clermont, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 126 days.

(21) Appl. No.: 14/013,875

(22) Filed: Aug. 29, 2013

(65) Prior Publication Data

US 2014/0003575 A1   Jan. 2, 2014

Related U.S. Application Data

(62) Division of application No. 13/235,813, filed on Sep. 19, 2011, now Pat. No. 8,564,401.

(51) Int. Cl.

| | |
|---|---|
| *G01N 23/04* | (2006.01) |
| *G01V 5/12* | (2006.01) |
| *B62B 3/14* | (2006.01) |
| *B62B 5/06* | (2006.01) |
| *G01V 5/00* | (2006.01) |

(52) U.S. Cl.
CPC .............. *G01N 23/04* (2013.01); *G01N 23/043* (2013.01); *G01V 5/0008* (2013.01); *B62B 3/1476* (2013.01); *B62B 5/06* (2013.01); *B62B 3/146* (2013.01); *B62B 3/1468* (2013.01); *B62B 2202/24* (2013.01)

(58) Field of Classification Search
CPC ........ G01N 23/04; G01V 5/0008; B62B 5/06; B62B 3/1476; B62B 3/146; B62B 3/1468; B62B 2202/24
USPC ................. 378/57; 280/47.34, 47.35, 33.991, 280/33.992, 33.996, 33.997
See application file for complete search history.

(56) References Cited

U.S. PATENT DOCUMENTS

| | | | | |
|---|---|---|---|---|
| 5,435,582 | A * | 7/1995 | Davidson | ................. 280/33.992 |
| 5,595,394 | A * | 1/1997 | Adamson | ................. 280/33.993 |
| D465,633 | S | 11/2002 | Le Marchand | |
| 7,418,077 | B2 * | 8/2008 | Gray | ............................... 378/57 |
| 7,660,388 | B2 | 2/2010 | Gray | |
| 7,703,776 | B1 | 4/2010 | Nugent | |
| 7,717,440 | B1 | 5/2010 | Baba | |

(Continued)

*Primary Examiner* — Jack Berman
(74) *Attorney, Agent, or Firm* — Marsh Fischmann & Breyfogle LLP; Kent A. Lembke

(57) ABSTRACT

A system for performing airport security screening of carry-on bags and other separately scanned carry-on items such as electronics. The system includes a number of airport divestment and luggage carts. Each of the carts includes a frame with a lower support for receiving carry-on luggage, and the frame further supports security bins for receiving separately scannable items (such as a computing device). The system includes a 3D scanner scanning items passed through a scanning tunnel. The system also includes a conveyance system engaging the carts and transporting the carts through the scanning tunnel for 3D scanning, with such scanning including the carry-on luggage and the separately scannable items in bins. Typically, the frame of each of the carts is formed of one or more non-metallic materials and is non-collapsible. Further, the carts may be oriented to be upright during transportation through the scanner.

29 Claims, 14 Drawing Sheets

(56) References Cited

U.S. PATENT DOCUMENTS

| | | | |
|---|---|---|---|
| 8,564,401 B2 * | 10/2013 | Padgett et al. | 340/5.6 |
| 8,733,765 B2 * | 5/2014 | Padgett et al. | 280/33.997 |
| 2010/0158191 A1 | 6/2010 | Gray | |

* cited by examiner

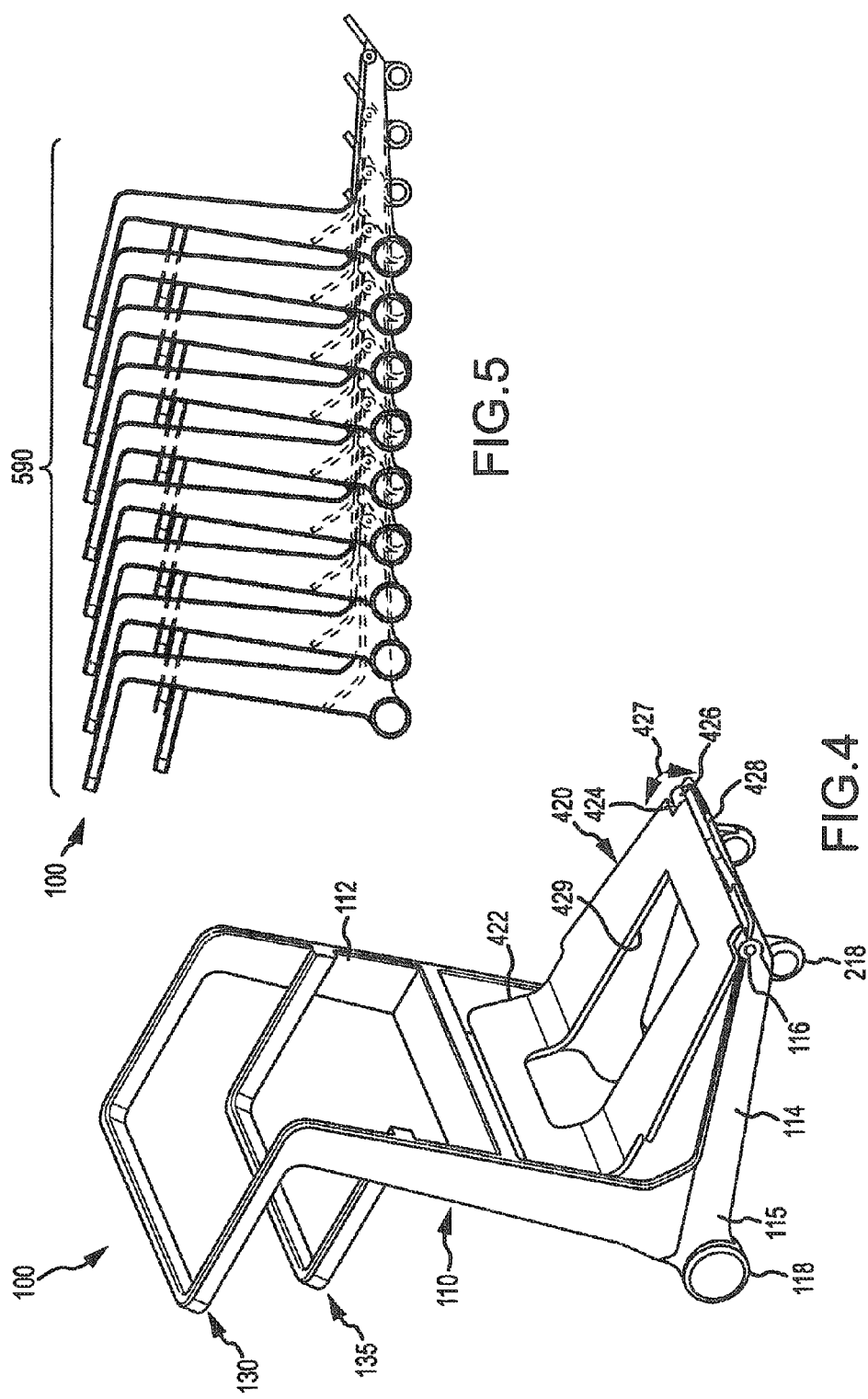

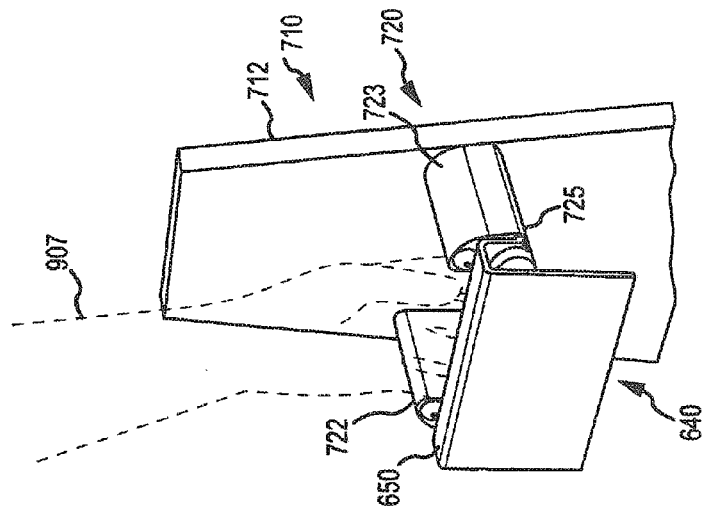
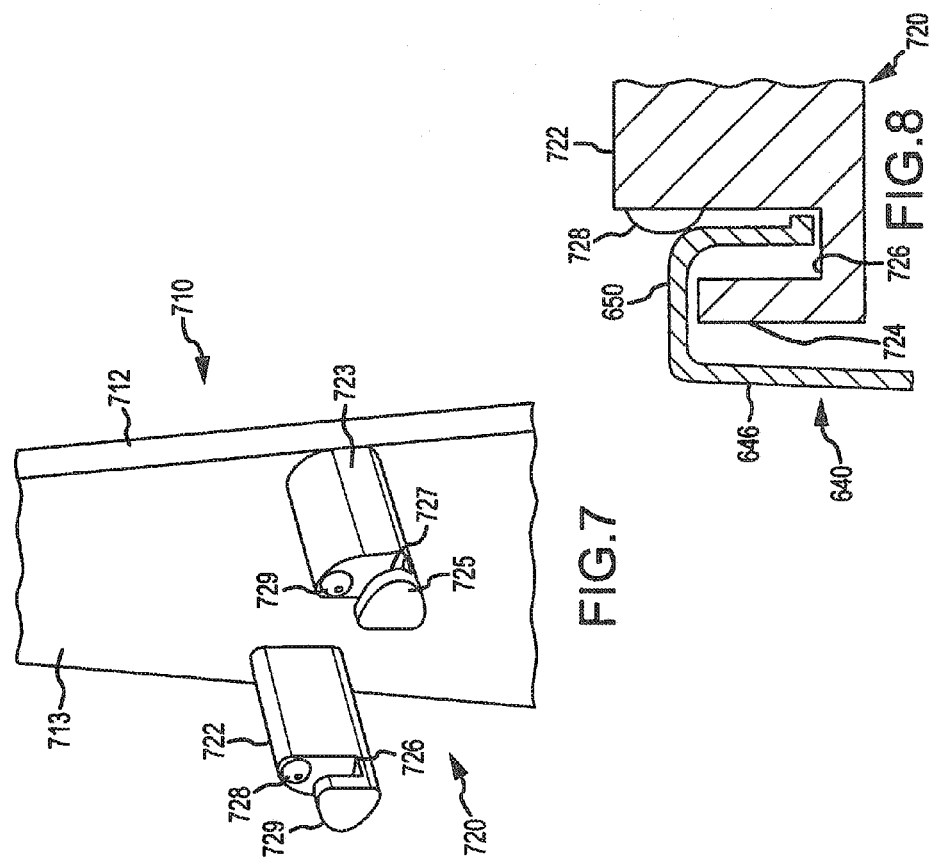

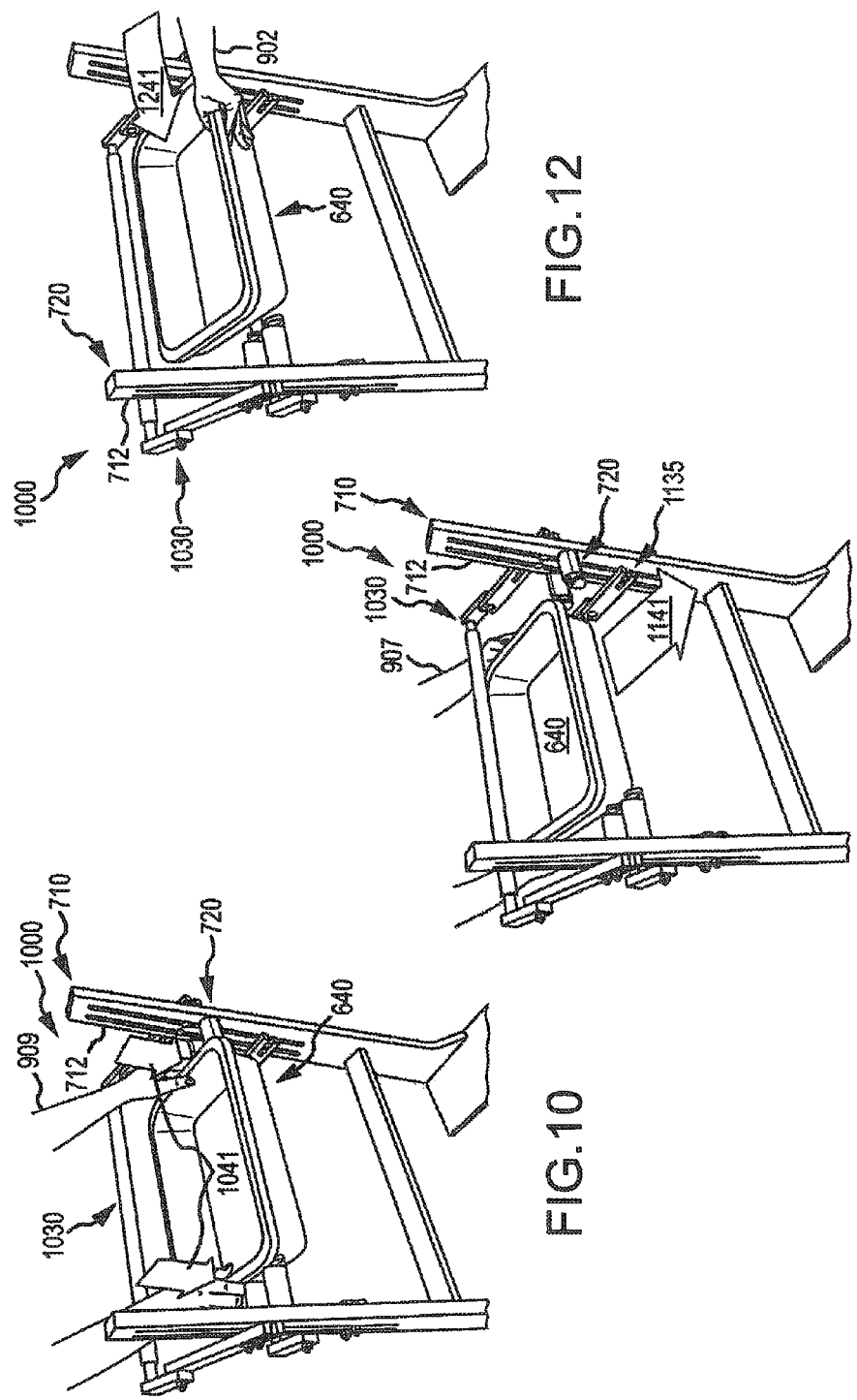

AIRPORT SECURITY SCREENING SYSTEM AND METHOD

CROSS-REFERENCE TO RELATED APPLICATIONS

This application is a divisional of U.S. patent application Ser. No. 13/235,813, filed on Sep. 19, 2011, which issued as U.S. Pat. No. 8,564,401 and which is hereby incorporated by reference.

BACKGROUND

1. Field of the Description

The present description relates, in general, to airport security and techniques for improving the security screening process at airports in teens of efficiency and personal experience. More particularly, the present description relates to an airport security screen system that may combine carts, each adapted for use in airports to facilitate passenger divestment of carry-on and personal items prior to checkpoint queues, with specialized or conventional screening devices to improve efficiency of airport security screening checkpoints.

2. Relevant Background

Air travel has become increasingly popular for travel from one destination to another, and, as a result, large numbers of people pass through airports. This presents a potential target for terrorism including airplane hijacking. Airport security processes have been developed to prevent harm to aircraft, passengers, and crew as well as to support national security and counter terrorism.

Generally, after obtaining an airline-issued ticket, passengers are screened through airport security into areas where the exit gates to the aircraft are located, with these areas being considered secure or sterile (or airside). Passengers are discharged from aircraft into the secure and airside areas so that they do not have to be re-screened prior to boarding a connecting, domestic flight. At the security screening checkpoint, each passenger is typically required to present a valid identification along with the ticket or boarding pass. Each passenger must also typically personally pass through a metal detector or advanced imaging technology unit while their personal items (e.g., items that may set off the metal detector) and carry-on items and luggage are passed through a scanner (e.g., an X-ray imaging device) via a conveyor belt.

Each country may have numerous security screening practices and restrictions, but each generally involves removing or divesting a number of items from your person and from your carry-on luggage to facilitate proper personal screening and scanning of carried items. Using the present restrictions in the United States as an example, passengers typically have to pass through a metal detector. Each passenger may have to remove metal objects including coins, belts, jewelry, and electronics such as phones, handheld computers, and so on from their pockets and place these in a security bin that is passed through the scanner on the conveyor belt. Additionally, the passenger is required to remove their shoes and place them in a security bin for separate scanning. If the passenger has to pass through an advanced imaging technology (AIT) device, the passenger may have to remove all items from their pockets and pass these through the separate carry-on scanner or X-ray machine.

In addition to preparing themselves, each passenger must remove certain items from their carry-on luggage prior to placing it and the removed items on the conveyor belt for X-ray scanning. For example, U.S. airport security presently requires all laptop computers, full-size video game consoles, DVD players, and video cameras to be removed from carry-on bags and submitted separately in plastic security bins for X-ray screening. The passenger also may have to remove their coats and jackets and pass these through a scanner for inspection. Further, U.S. airline passengers can only take 3 ounce or smaller containers of liquid or gel onto an aircraft, and all of these containers need to fit into a single 1 quart clear plastic, zip-top bag, and this clear plastic bag, which many use to hold all their toiletries and the like, also has to be removed from carry-on bags and placed in a security bin for scanning separately from the carry-on bag (e.g., with the passenger's shoes in one of the plastic security bins).

Anyone who has recently traveled by air understands that one of the largest delays and points of congestion occurs at the airport security checkpoint. Business and other experienced travelers are mixed with those inexperienced with air travel and with security requirements. Additionally, families traveling with smaller children typically find the airport security checkpoints particularly stressful as they must help their children through the scanning process and infants and children have to be taken out of carriers and strollers and carried through the metal detector while the carriers and strollers have to go separately through the X-ray scanner on the conveyor belt.

The process is typically very inefficient as the complete divestment process occurs in the security screening queue, with passengers trying to hurry to remove or divest all their items that have to be separately screened from their person and carry-on bags into security bins. The bins with their personal items, electronics, liquids, and the like and their carry-on luggage are then placed on the security screening belt for inspection by airport security. Many travelers will require multiple security bins for all of their items, and items will often be forgotten or last minute security requirements will be identified (e.g., trying to finish a drink, asking for a clear plastic back, throwing away shampoo and other gels/liquids that are too large in volume, removing additional jewelry or a belt, and the like). All of these issues lead to a rushed and stress-filled experience for nearly all travelers including those who have no carry-on luggage as they are delayed by fellow travelers that, in turn, feel even more hurried by those waiting behind them in the queue. Further, these issues lead to traveler inefficiencies and problems moving smoothly through the security queue, which leads to stop and starts and idle time for scanning machines and security personnel (e.g., waiting for travelers to initially load bins and then remove additional items for scanning upon failure to pass through a metal detector or upon learning of scanning procedures at the security queue).

Hence, there remains a need for improvements that enhance the efficiency of the airport security screening process. Preferably, such improvements would allow individuals and families to more effectively pass through metal detectors and X-ray scanners in a more prompt and enjoyable manner (e.g., with less last-minute divestment of personal and carry-on items from their person or bags, with less anxiety over meeting existing security requirements, and so on). Additionally, the improvements would preferably provide benefits to the airport operations and to efficiency and effectiveness of the security screening process. These benefits may include less congestion in security check points and increased efficiency in use of both scanning equipment and security personnel.

SUMMARY

Initially, the present description addresses the above and other problems by providing an airport divestment and luggage cart. The inventors recognized that air travelers have to carry all of their carry-on luggage through an airport, are required to complete the divestment process (e.g., preparing for personal and carry-on screening) in the security screening queue, and then load all carry-on luggage and personal items onto a security screening or conveyor belt. This process creates a great deal of stress, anxiety, and operational inefficiency especially for families with children and with little traveling experience and knowledge of the many security requirements.

To make the security scanning process more efficient and less stressful, it was determined that it would be useful to provide a cart designed specifically for use in airports. The cart is configured to allow the user (e.g., airline passenger) to complete the security divestment process away from and well before reaching the security screening queue. Such upstream or separate divestment allows them to divest their personal belongings and load/unpack their carry-on luggage at their own pace outside of the frantic security line. Passengers are then able to navigate the airport much easier with their luggage cart rather than pulling and carrying bags that are not ready for security checkpoints.

In addition to embodiments of a divestment cart, the present description explains an improved airport screening system and methods to enhance the efficiency of the security process (greater passenger throughput at each checkpoint) and to improve the screening process experience for each passenger. The security screening system may include a scanner that is adapted for receiving the divestment cart such as with a tunnel large enough for the upright (or re-oriented) cart and a cart conveyance assembly that engages the cart and moves it at a desired rate through the scanner for 3D or other scanning operations. The cart may be provided with an all plastic and/or ceramic construction, which may be pushed directly through or moved via the conveyance assembly through scanners adapted for use with such carts. In such embodiments, the cart may be adapted to arrange passenger items such as laptops, liquids, and personal items in orientations and locations to achieve better scanning results, e.g., with limited blocking of sight lines to support three-dimensional (3D) X-ray scanning of the cart and/or in locations known/expected by the scanner and its control software.

In other embodiments, though, the cart is adapted for loading carry-on bags and, more importantly, for containing divested items in security bins or containers suited for placing upon a conveyor belt or security screening belt for passing through a security scanner. In other words, a conventional scanner may be utilized in some embodiments of the security screening system and method with the system. For example, the cart may be adapted to detachably support one, two, or more security bins made of translucent or clear plastic or ceramic that may be loaded with the passengers personal items during the divestment process upstream from the security checkpoint, and the passenger may then quickly detach these bins filled with their items from the luggage cart and then place the filled bins upon the security screening belt for inspection by airport security with an X-ray or other scanner. In one embodiment, the security bins may be standard security bins used by a particular airport or may be pre-approved/authorized by airport security for use with their scanners. For example, a cart may support one or more bins of standard size and shape that the passenger uses to hold a first set of personal items such liquid containers and a coat while a specially adapted second (or third) security bin may hold a second set of personal items such as the passenger's laptop, the passenger's cellphone, the passenger's jewelry and coins, and so on. Each of these security bins may be placed upon the security screening belt, but the pre-loading of these bins (i.e., divestment process) allows the passenger to much more efficiently pass through a security check point.

More particularly, a system is provided for use in performing airport security screening of carry-on bags and other carry-on items such as electronics that are required to be separately scanned (e.g., apart from the luggage/bags). The system includes a plurality of airport divestment and luggage carts. Each of the carts includes a frame with a lower support for receiving carry-on luggage, and the frame further supports at least one bin for receiving separately scannable items (such as a laptop or liquid containers). The system also includes a scanner performing 3D security scanning of items passed through a scanning tunnel (e.g., a rectangular passageway). Further, the system includes a conveyance system engaging or receiving each of the carts and transporting the carts through the scanning tunnel for 3D scanning of the carts, with such scanning including the carry-on luggage and the separately scannable items in the at least one bin (e.g., the cart is scanned while loaded without requiring removal of items or collapse of the frame by the passenger).

In some implementations, the frame of each of the carts is formed of one or more non-metallic materials and is non-collapsible. Further, the carts may be oriented to be upright during transportation through the scanner. In some of these cases, a set of wheels is provided on the frame of each of the carts, and the conveyance system includes a conveyor belt or other device/component for contacting a lower surface of the frame such that the cart rolls on the wheels through the scanning tunnel. The cart frame and the bin may be arranged to provide unobstructed views to the scannable items and the carry-on luggage at least from above and from at least one side (e.g., provide 180 degrees or more open access in some cases) as the cart is transported through the scanner.

In some embodiments, the scanner includes a controller running a screening module (software or computer code/programming) performing one or more functions during the 3D scanning, and the screening module may perform these functions based on retrieved cart configuration information including 3D locations of the bins and the lower support (e.g., positioning of the carry-on luggage).

BRIEF DESCRIPTION OF THE DRAWINGS

FIG. 4 illustrates a front perspective view of the cart of FIGS. 1-3 modified to include another embodiment of an lower luggage tray or shelf shown to be pivoted upward;

FIG. 5 shows a side view of a number of the carts of FIG. 4 in a nested arrangement showing front bumpers being received in tray central grooves or openings adapted for such a purpose;

FIG. 7 is a partial perspective view of a bin attachment assembly for use on each vertical support of a cart frame for detachably supporting a cart bin, such as the bin of FIG. 6;

FIG. 8 is a sectional view of one of the bin support rails or arms as a bin is being positioned within a receiving groove at the end of the arm/rail;

FIG. 9 illustrates the bin attachment assembly of FIGS. 7 and 8 after the bin has been dropped into place on the rails/support arms or just prior to vertical removal or lifting off of the detachable bin from the rails/support arms from a cart;

FIGS. 10-12 illustrate a cart using the bin attachment assembly of FIGS. 7-9 to facilitate three types of bin attachment or loading (and, later, detachment or unloading/removal for placement on a security screening belt) including vertical attachment, rear sliding attachment, and front loading;

DETAILED DESCRIPTION

Figure 1:
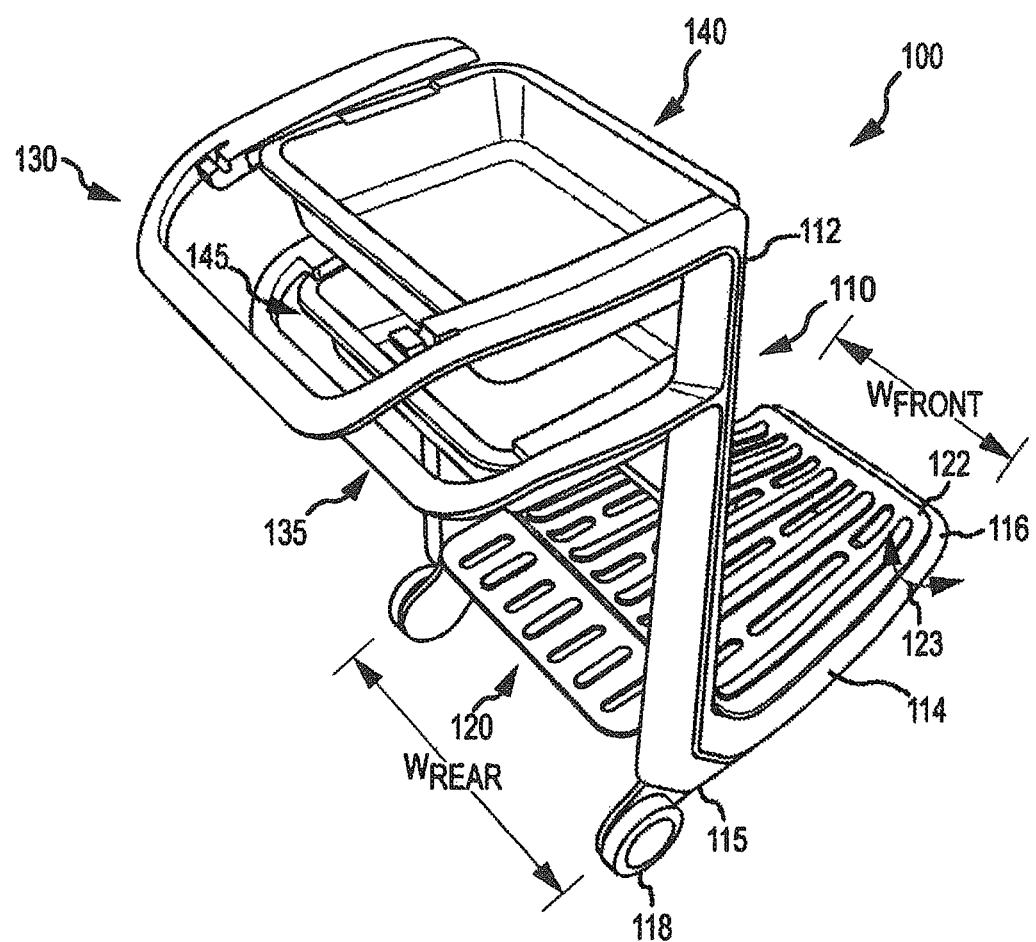
FIG. 1 is a perspective, overhead, rear view of an airport divestment and luggage cart according to one embodiment shown prior to loading during a passenger divestment process.

Prior to the present invention, passengers departing from an airport had to carry or pull all of their carry-on luggage through the airport. The passengers were required to complete the process of divesting (or divestment process) in the security screening queue adjacent the security scanners and then load all their carry-on luggage and personal items, which are placed in security bins, on a security screening or conveyor belt that feeds these items through a scanner for 3D scanning and inspection. The existing security screening process creates a great deal of stress, anxiety, and operational inefficiencies, especially for families with children and for those passengers with little traveling experience and knowledge.

The following description describes an overall security screening method and system for allowing departing passengers to more easily prepare for and pass through an airport security checkpoint. The following description begins with a detailed discussion of two embodiments of an airport divestment and luggage cart and then proceeds to discussions of the airport security screening system and method, which may utilize aspects of the described cart.

Briefly, though the invented process may include a unique luggage cart solution that allows passengers to divest their personal belongings and load their carry-on luggage onto the cart at their own pace at a divestment station located outside of and upstream/away from the often frantic security line. As part of the divestment process, staff members or assistants may be present at the divestment station to assist the travelers in divesting their items and loading their carts for efficient passage through security check points and proper scanning. The divestment station typically will have benches, seats, and tables that facilitate easy removal of personal items from carry-on luggage and other locations and for placing items in security bins (rather than having to juggle luggage and two, three, or more security bins in a security queue).

Passengers are then able to navigate the airport much easier with the loaded luggage cart until they decide to pass through a security checkpoint. At such time, the loaded luggage carts may be sent directly through a security screening machine or scanner via an automatic conveyance system, and this enables forward momentum of the screening process to continue without line stops for divestment as use of the special cart and scanner adapted for such carts eliminates the need for passengers to push multiple bins with their shoes and laptops and their bags through a traditional scanner. Passengers then reunite with their cart containing all of their belongings post-security screening where they can take their cart and belongings to a recomposure area (or cart collection station) at or away from the security screening checkpoint outlet (which, again, can be a point of congestion and stress) such as all the way to their airside terminal.

In some cases, the scanner would have enough clearance to receive the luggage cart in a standing or upright orientation, and, hence, the port or scanning tunnel/tube may be at least 45 inches in height and at least 25 inches in width. The security screening system would include an automatic conveyance system or assembly that would receive and engage each luggage cart and then transport the luggage cart through the scanner (adapted for receiving and 3D scanning, in most cases, the luggage cart and the items loaded upon the cart) after which it would be reunited with the passenger. The cart may be engaged with a conveyor element (such as a conveyor belt that engages a lower surface or locking element on a horizontal support of the cart frame) by the passenger themselves or by a security screening representative. The scanner may utilize software that has advanced knowledge of the cart's design and configuration including locations of carry-on luggage and security bins that are used to hold particular items (such as the passenger's laptop or similar electronic devices, a bin for liquid containers, a bin for smaller metallic and personal items such as a cellphone, PDA, or the like, and so on). In this manner, the operator of the scanner may be assisted by the software in identifying particular items on the cart and clearing the cart or more effectively identifying items requiring further inspection.

In other cases, though, the security system will include a conventional scanner, and the passengers will remove the bins from the carts and place them on the conventional scanner belt for scanning along with their carry-on luggage. However, the process is still greatly enhanced as divestment occurs apart from and before the security queue, which increases throughput of the security screening checkpoint and reduces frantic last-minute filling of security bins and the like.

Briefly, the cart may be thought of as an airport divestment and luggage cart that may be fabricated from plastics and/or ceramics to facilitate its components being scanned or inspected by security scanners. The cart may have dual handles with an upper handle for adults and taller children and a lower handle for children. The cart supports one or more security bins, such as plastic security bins in the form of the standard security bins used in airports or with a security-accepted form factor and construction materials. The security bin(s) is detachably attached and supported such that it can be loaded separate from the cart frame and also later removed from the cart frame to be placed upon a security screening belt or scanner conveyor belt. The cart frame further includes a lower luggage tray or shelf for receiving one, two, or more bags or pieces of luggage, and the cart may be open above at least a portion of this luggage tray/shelf (e.g., with the security bins vertically offset rearward toward the handles to provide space for stacking carry-on luggage/bags). Further, the luggage tray and cart frame may be configured to allow nesting of multiple carts for collection near a security check point, such as downstream from scanners, and for storage in the airport at a location accessible by passengers initially picking up or checking out a cart for use in the security scanning process, such as before or after ticketing.

FIG. 1 illustrates one embodiment of an airport divestment and luggage cart 100 that may be used to facilitate the security screening process as discussed above. As shown, the cart 100 includes a cart frame 110 that may be formed of ceramics, plastics, or other non-metallic materials in cases such as in applications in which the cart 100 is passed as a unit or the frame 110 is passed through an airport security scanner. The cart frame 110 includes a pair of vertical supports 112, which are each attached at a lower or bottom end to a lower horizontal support 114 at a rear or back end 115 of the horizontal support 114 (which may also be called a tray support or mounting element of the frame 110). The horizontal support 114 may be formed with a left arm and a right arm that are connected at a front end or forward edge member 116, and the two arms may be spaced apart to facilitate nesting and to reduce the weight and materials required for fabricating the cart 100. A pair of wheels 118, which may be fixed or non-pivoting in some cases, is supported for rotation on the horizontal support 114 near the rear end 115 to allow the cart 100 to be easily rolled by a passenger through an airport.

The cart 100 includes a luggage tray or shelf 120 that is pivotally attached, as shown with arrow 123, at a front or forward end or lip 122 to the front end 116 of the horizontal support 114. The shelf 120 is attached to the cart frame 110 to lift up or pivot 123 to allow the cart 100 to be nested with other similarly designed carts. The horizontal support 114 includes shelves/ledges or stops for receiving the tray 120 as it is pivoted 123 downward to a lowered or at rest position to support or receive luggage/bags (e.g., the outer surfaces of the tray 120 may rest on one or more portions of the support 114 along its length between the rear 115 and front 116).

To further facilitate nesting, the width, $W_{Rear}$, of the cart 100 and horizontal support 114 near the rear end 115 is wider than the width, $W_{Front}$, of the cart and horizontal support 114 near the front end 116. In this manner, the cart 100 may receive a second cart (not shown in FIG. 1) with the second cart's front end 116 causing the tray 120 to pivot 123 upward and the horizontal support 114 to be received between the spaced apart arms of the horizontal support 114. The widths may vary in practice with the rear width, $W_{Rear}$, typically being between about 20 inches and 30 inches and the front width, $W_{Front}$, typically being less (e.g., 3 to 8 inches less) and between about 15 and 25 inches.

The cart 100 also includes dual handles for pushing the cart 100 on the wheels 118. Specifically, an upper handle 130 is provided that extends rearward (or in an opposite direction than the shelf or tray 120) from a top end of the vertical supports 112, and a lower handle 135 is also provided that extends rearward (and in a parallel manner to the handle 130) from the vertical supports 112 at an intermediate position spaced apart a distance (such as 6 to 14 inches with about 10 inches used in some case) from the mounting location of the upper handle 130. The upper handle 130 is provided for use by adults and older/taller children while the lower handle 135 is provided for use by children, which allows the cart 100 to be used by passengers with a wider range of heights than if only one handle was provided on the cart 100 (although such an arrangement may be desirable in some applications of the cart 100).

As shown, the cart 100 also includes two bins 140, 145 that are detachably supported so that they can be removed to ease loading of personal items during a divestment process and to allow the bins 140, 145 to also be removed from the cart 100 and placed upon a security screening belt. As shown, the bins 140, 145 may take a form that is similar to or even identical to (matching) conventional security bins in the airport in which the cart 100 will be provided to passengers. For example, in the United States, the bins 140, 145 may be similar to or actually be Transportation Security Administration (TSA) security checkpoint bins used in TSA-approved scanners. The bins 140, 145 may be supported upon the upper and lower handles, 130, 135 as shown or, in some cases, supported by bin attachments on the vertical supports 112 of frame 110. The bins 140, 145 are shown to be stacked with one bin 140 positioned directly above the second bin 145, but other embodiments of a cart 100, such as carts that are passed through a scanner without removal of the bins 140, 145, may provide supports on the frame 110 or handles 130, 135 with some amount of offset to facilitate scanning. Note, the handles 130, 135 and tray support 114 are typically rigidly affixed to the vertical support 112 such that the frame 110 is a unitary and rigid design (e.g., not collapsible).

Figure 2:
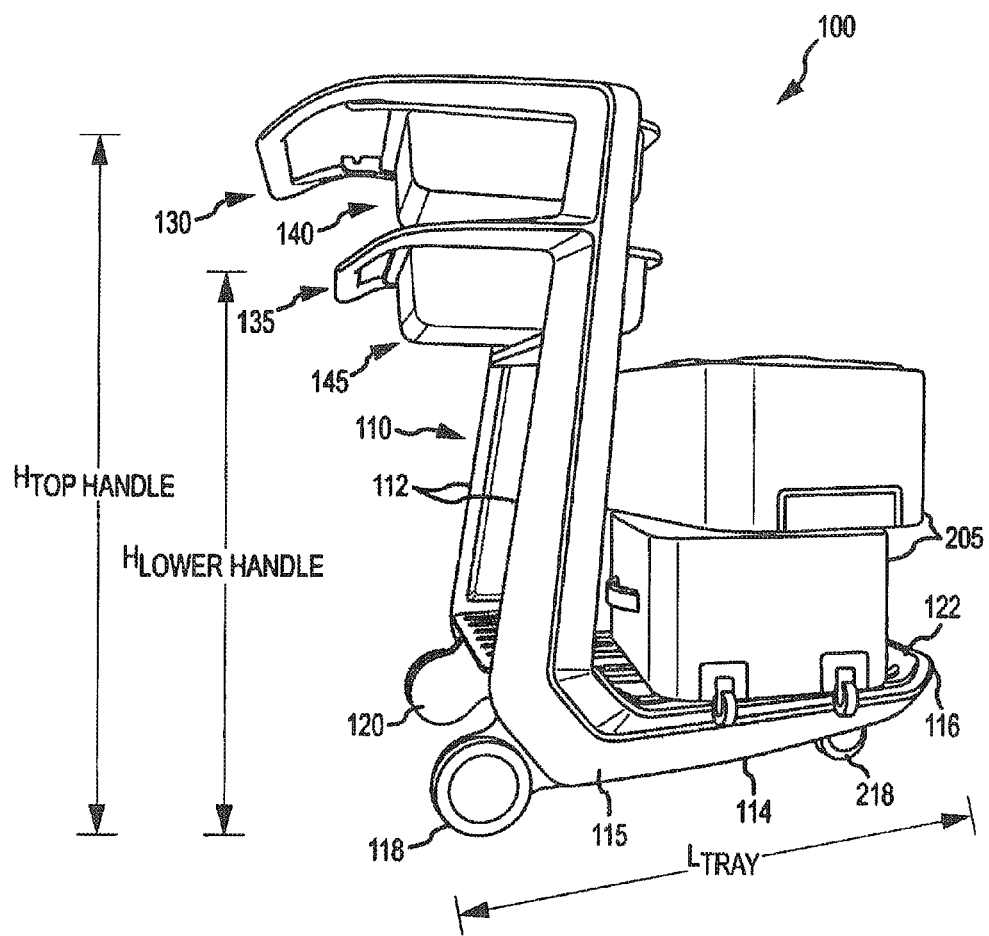
FIG. 2 is a side view of the cart of FIG. 1 with the lower tray loaded with a pair of carry-on bags.
Figure 3:
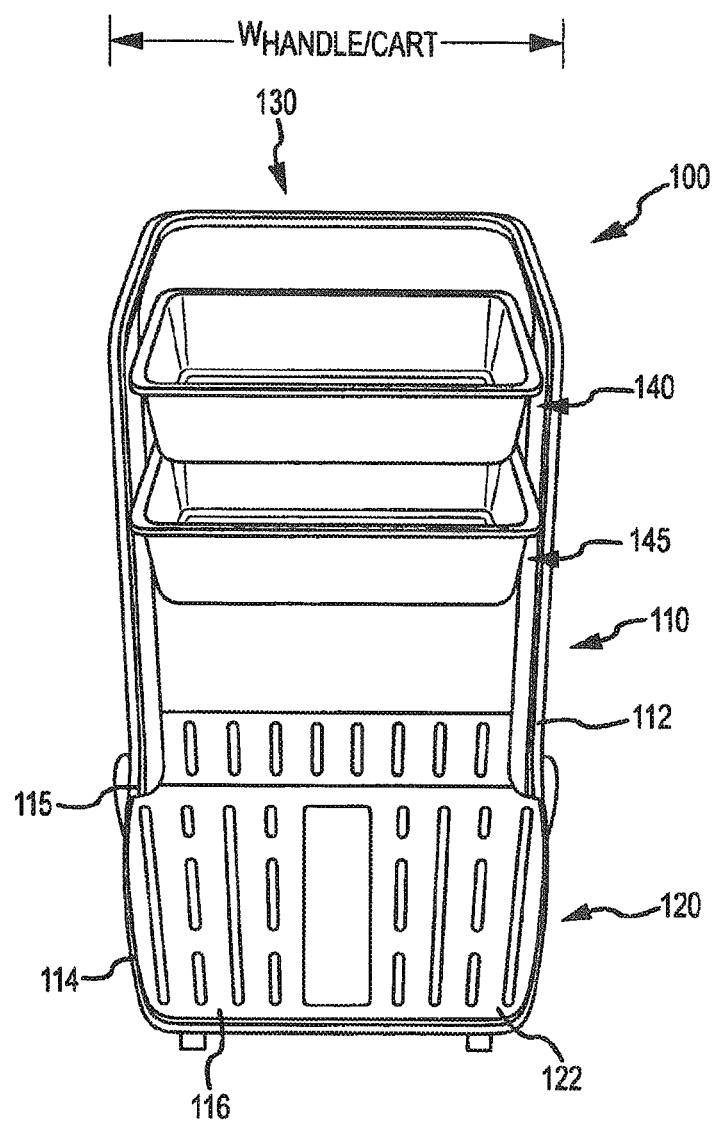
FIG. 3 is front view of the cart of FIGS. 1 and 2.

FIGS. 2 and 3 illustrate side and front views of the cart 100, respectively, with FIG. 2 showing the cart 100 loaded with carry-on bags or luggage 205. As shown, the positioning of the handles 130, 135 and supported bins 140, 145 rearward or horizontally offset from the luggage tray 120 is desirable as it facilitates placement of the bags 205 on the tray 120. It provides a vertical open space over the luggage tray 120 such that the luggage items 205 may be vertically positioned on the tray 120 rather than having to be loaded horizontally requiring a passenger to stoop or bend over to push their luggage into the cart 100. Further, two or more bags 205 can be positioned on the cart 100 with this open arrangement while still allowing for detachable attachment of bins 140, 145 and providing dual handles 130, 135 on the frame 110. The location of the handles 130, 135 and bags 205 on tray 120 also retains a center of gravity in a central location over the center of the tray 120 and lower horizontal support 114 and at or below a midpoint of the height of the vertical supports 112 (especially when two or fewer bags 205 are loaded onto cart 100).

FIG. 2 illustrates that the upper handle 130 has a height, $H_{Top\ Handle}$, that is somewhat greater than the height, $H_{Lower\ Handle}$, of the lower handle 135, with one embodiment utilizing heights of 41 and 31 inches respectively for the two handles 130, 135 to accommodate a large range of users/people. The length, $L_{Tray}$, of the tray 120 (which determines/defines the cart length) may vary in practice but typically will be selected to be large enough to allow a typical carry-on bag to be placed onto the tray 120 with clearance for the bins 140, 145, e.g., the length, $L_{Tray}$, may be about 30 to 40 inches with 35 to 37 inches used in some implementations.

FIG. 2 also shows that the cart 100 includes a pair of forward wheels 218 attached to the lower surface of the horizontal support 114 of frame 110, and the wheels 218 may be attached for pivoting such as via a swivel mount to support 114 to enhance mobility and quick turning of the cart 100. FIG. 3 illustrates that the upper handle 130 may have a width, $W_{Handle}$, that is the same or somewhat greater (such as 1 to 4 inches or more) than the base 115 width, $W_{Rear}$. FIGS. 2 and 3 also illustrate that the stacking of the bins 140, 145 visually hides or shields contents of the lower bin 145, and a passenger/user may, therefore, feel more comfortable in placing some of their personal items in the lower bin 145 such as liquids (e.g., in security-approved containers such as 3-oz plastic bottles or the like) and other personal items such as prescription drugs and toiletries.

FIG. 4 illustrates the cart 100 without any bins attached and as it may be modified to include a differing tray arrangement. Specifically, as shown, the cart 100 includes a luggage or lower tray/shelf 420 with a planar body having two side arms or plates separated by (or defining) a central opening or bumper receiving groove 429. The tray 420 includes a rear bumper 422 and a front plate or arm 424 that is pivotally 427 mounted to the front end 116 of the horizontal support 114 of frame 110 via axle or pin 426. A front lip or bumper 428 may extend outward from the front plate or arm 424 of the body of the tray 420. The bumpers 422, 428 may both extend upward and outward/away from the body of the tray 420 such as at an angle of 30 to 90 degrees (as measured from the plane passing through the body of tray 420).

The front bumper 428 typically would have a width that is less than the width of the receiving groove or opening 429 in the body of the tray 420 to facilitate nesting as is shown in FIG. 5. As shown, a number or set 590 of nested carts 100 may be pushed together with front bumpers 428 received in the grooves 429 and the tray 420 pivoted upward a small amount to allow the bumper 428 to be pushed up to the front plate/arm 424. The front and rear bumpers or lips 428, 422 are raised a height (such as 1 to 4 inches or the like) to hold any bags/luggage loaded onto the tray 420 in place and reduce the risk of its tipping or falling off of the tray 420. The lip 428 may also act as a protective bumper for any loaded luggage such that the bumper/lip 428 strikes objects or obstructions to the cart 100 rather than sides of the luggage/bags on cart 100.

Figure 6:
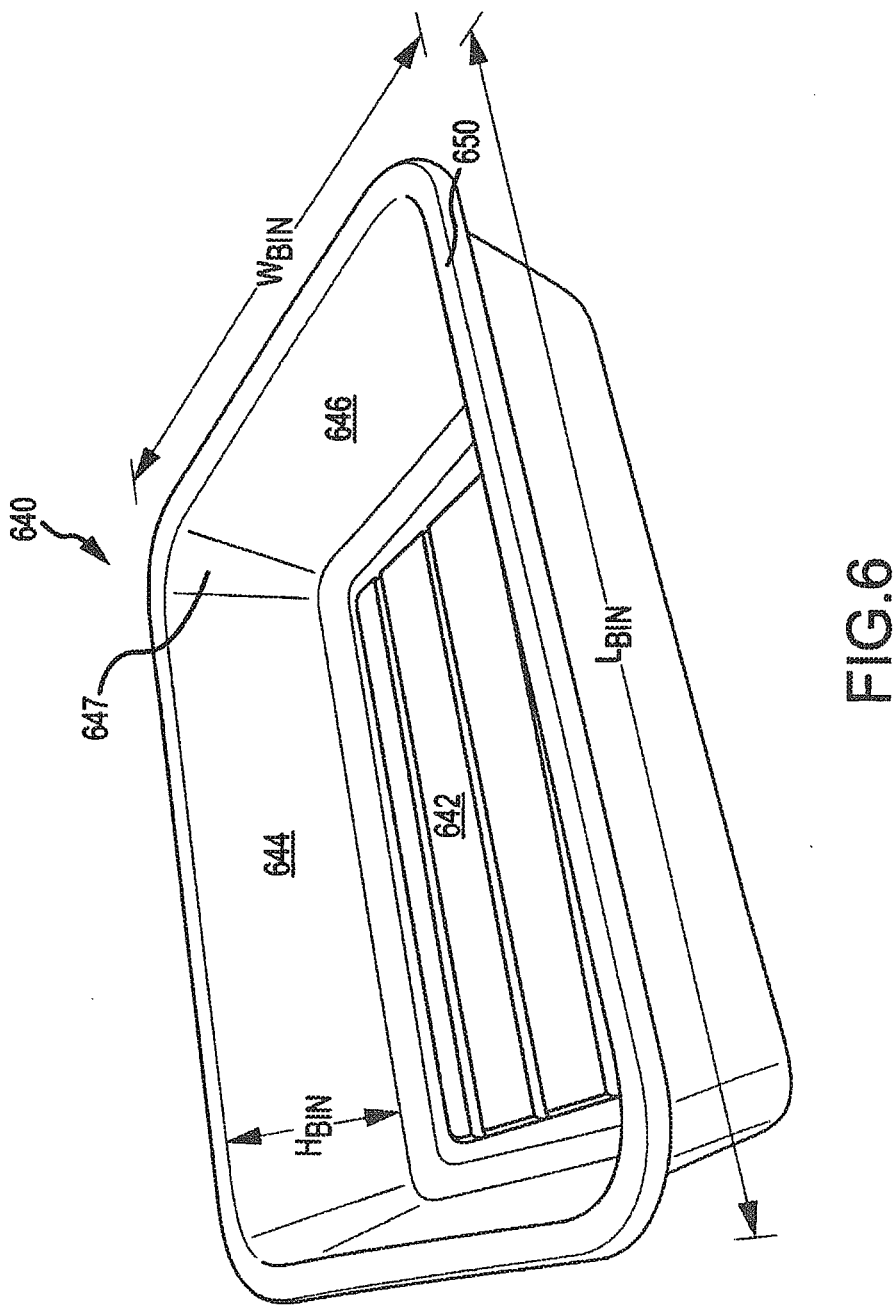
FIG. 6 is a top perspective view of an exemplary cart bin (or security bin) that may be used with a cart of the present description and that may have a similar shape, size, and/or design as a conventional or standard airport security bin.

As discussed above, the cart may include and be adapted for selectively attaching and removing one or more security/storage bins. FIG. 6 illustrates one embodiment of a bin 640 that may be used with a cart, such as cart 100 of FIGS. 1-5, for storing personal items divested from an aircraft passenger prior to a security screening checkpoint. The bin 640 has a planar base or bottom wall 642, a first pair of longer sidewalls 644, and a second pair of shorter sidewalls or endwalls 646 (that may join at rounded or orthogonal corners 647). The sidewalls 644, 646 extend upward from the edges of the base 642 to define a height or depth, $H_{Bin}$, of the bin 640, such as 4 to 6 inches or the like. The sidewalls 644 have a length, $L_{Bin}$, that defines the length of the bin 640, and the sidewalls 646 have a length, $W_{Bin}$, that defines the width of the bin 640. A range of each may be used such as a length, $L_{Bin}$, of 18 to 24 inches and a width, $W_{Bin}$, of 12 to 18 inches. In some cases, these dimensions are chosen to match a conventional TSA security bin such as 5 inch sidewall heights (or bin depth), a length of 21 inches, and a width of 15.5 inches. The bin 640 may also include an upper lip or shoulder 650 extending outward from the top edges of the sidewalls 644, 646, and the lip 650 may act as a handle for the bin 640 and be curved with a recessed surface (e.g., for receiving a user's fingers when they handle or pick up the bin 640 and place it in or take it out of a cart).

With this or similar bins 640, a cart may be provided with a bin attachment assembly that is adapted for selective or detachable mounting of the bin 640 to the cart frame. For example, FIGS. 7-9 illustrate one bin attachment assembly 720 useful for many cart configurations. As shown in FIG. 7, the bin attachment assembly 720 is attached to each of the two vertical supports 712 of a cart frame 710. Specifically, the assembly 720 includes a first and second elongated rails or support arms 722, 723 affixed to an inner surface 713 of the vertical support 712 of the cart frame 710. As shown in FIG. 9, the two rails 722, 723 extend out a distance from the surface 713 (such as 2 to 5 inches or the like) and are spaced apart (such as 4 to 6 inches) to define a gap or space between the rails 722, 723 to allow a user/passenger to place their hand 907 between the rails 722, 723 to attach the bin 640 to the pin and to later remove the bin 640 from the assembly 720 by grasping the lip or bin handle 650.

In the assembly 720, an inner stop or end piece 724, 725 is provided on an inner end of each rail 722, 723 and spaced apart a distance (e.g., 0.5 to 2 inches or the like) to defined a support surface or groove/slot 726, 727 for receiving the sidewall of the lip/handle 650 of the bin 640. The stops or end pieces 724, 725 may include upper and side sloped and/or curved surfaces to allow a sliding action to support front or rear loading and unloading of the bin 640 into and out of the groove 726, 727. Dome or other-shaped retainers 728, 729 may be provided on the rails 722, 723 across the grooves 726, 727 opposite the stops 724, 725, and the retainers 728, 729 may provide contact surfaces to contact and apply compressive/retaining forces upon an inserted rim or handle 650 during insertion into the groove/slot 724, 725 (and also upon removal so as to retain the bin 640 from moving vertically under normal or non-removal operations). The handle 650 typically is formed of a plastic that will flex and then elastically return to its original shape during such insertion and removal operations.

FIGS. 10-12 illustrate use of the bin attachment assembly 720 during three differing bin loading operations. As shown, a cart 1000 is provided that includes a cart frame 710 with vertical side supports 712 upon which the bin attachment assembly 720 is provided on an inner surface. The cart 1000 also includes an upper handle 1030 and a lower handle 1135 extending rearward from the vertical side supports 712 of cart frame 710 such as from mounting locations and/or surfaces on the supports 712 opposite the bin attachment assembly 720. The bin attachment assembly 720 is positioned on the vertical support 712 between the mounting locations/ends of handles 1030, 1135 in this embodiment (whereas in the cart 100, the attachment assembly provided bin supports on or near the horizontal arms of the handles 130, 135). Further, the cart 1000 is a single bin design rather than a stacked bin design as with cart 100, and only a single bin attachment assembly 720 is provided to support the bin 640.

FIG. 10 illustrates a top loading use of the cart 1000. As shown, the bin 640 is vertically lowered or dropped 1041 into position on the bin attachment assembly 720 (or its rails) by the user (e.g., a passenger) with their hands 907 and arms 909 fitting between the rails of assembly 720 while they are still gripping the handle or rim 650 of the bin 640. FIG. 11 illustrates a rear, sliding loading use of the cart 1000. As shown, the bin 640 is slid 1141 forward to engage the rails of the bin attachment assembly 720 with the sidewalls of the handle 650 inserted into and received within the grooves/slots 726, 727 between the stops 724, 725 and ends of rails 722, 723. Conversely, FIG. 12 illustrates a front, sliding loading use of the cart 1000. As shown, the bin 640 is slid 1241 rearward into the cart 1000 with the grooves/slots 726, 727 receiving the sidewalls of the bin handle 650 such that the bin 640 is detachably supported or mounted within the cart 1000. Again, this would typically occur at a divestment station or location away from an airport security checkpoint. In some embodiments, the bin 640 is loaded into the cart 1000 with its longer sides extending across the width of the cart 1000 or between the inner surfaces of vertical supports 712, as this allows the cart 1000 to be shorter in length while still leaving an open space above much of the luggage tray.

In some embodiments, it may be desirable for the cart to be designed with unobstructed or direct lines of sight to all or nearly all portions of each security bin and to the luggage tray. For example, applications may be developed that allow the cart to be pushed through a scanner or to be placed upon a scanner for 3D X-ray scanning. In such cases, a cart design that avoids stacking of bins as was done on cart 100 may be desirable such that inspectors can more readily view divested items and carry-on luggage in scanned imagery. Further, it may be desirable for the locations of bins to be known by the inspector personnel and/or the scanning software such that bins and expected items in such bins can be more readily identified. For example, one bin may be particularly configured for laptop and other larger computers or electronic devices, one bin may be configured for smaller personal items such as coins, jewelry, and cellular phones/PDAs/wireless communication devices, and the like, and another bin may be designated for use for larger items such as shoes and small liquid containers. The divestment process may involve loading these bins with particular personal items, and then inspection can be more effective and efficient.

Figure 13:
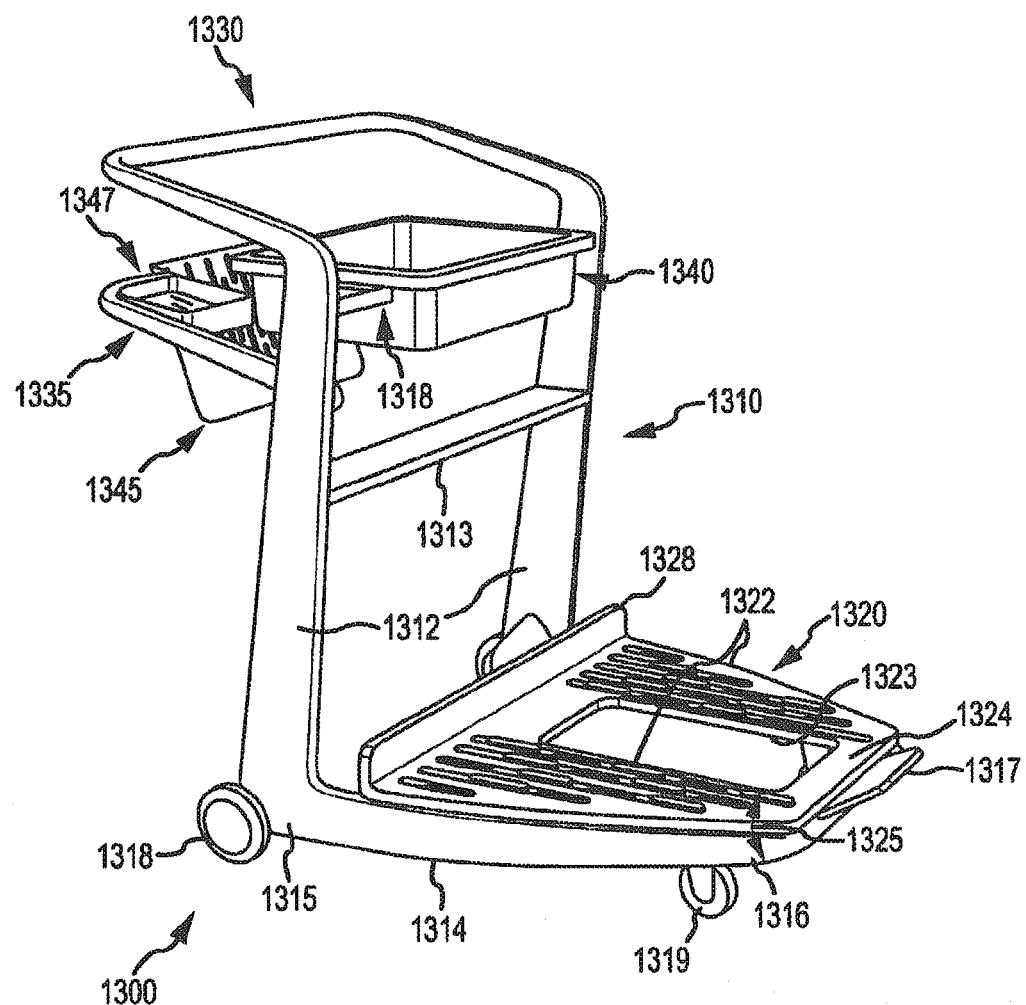
FIGS. 13 and 14 illustrate front and rear perspective views of another exemplary airport divestment and luggage cart of the present description configured with multiple, differing sized bins that may be rigidly affixed (e.g., for applications where the cart is allowed to pass directly through an airport scanning device) or detachably mounted to the cart frame.
Figure 14:
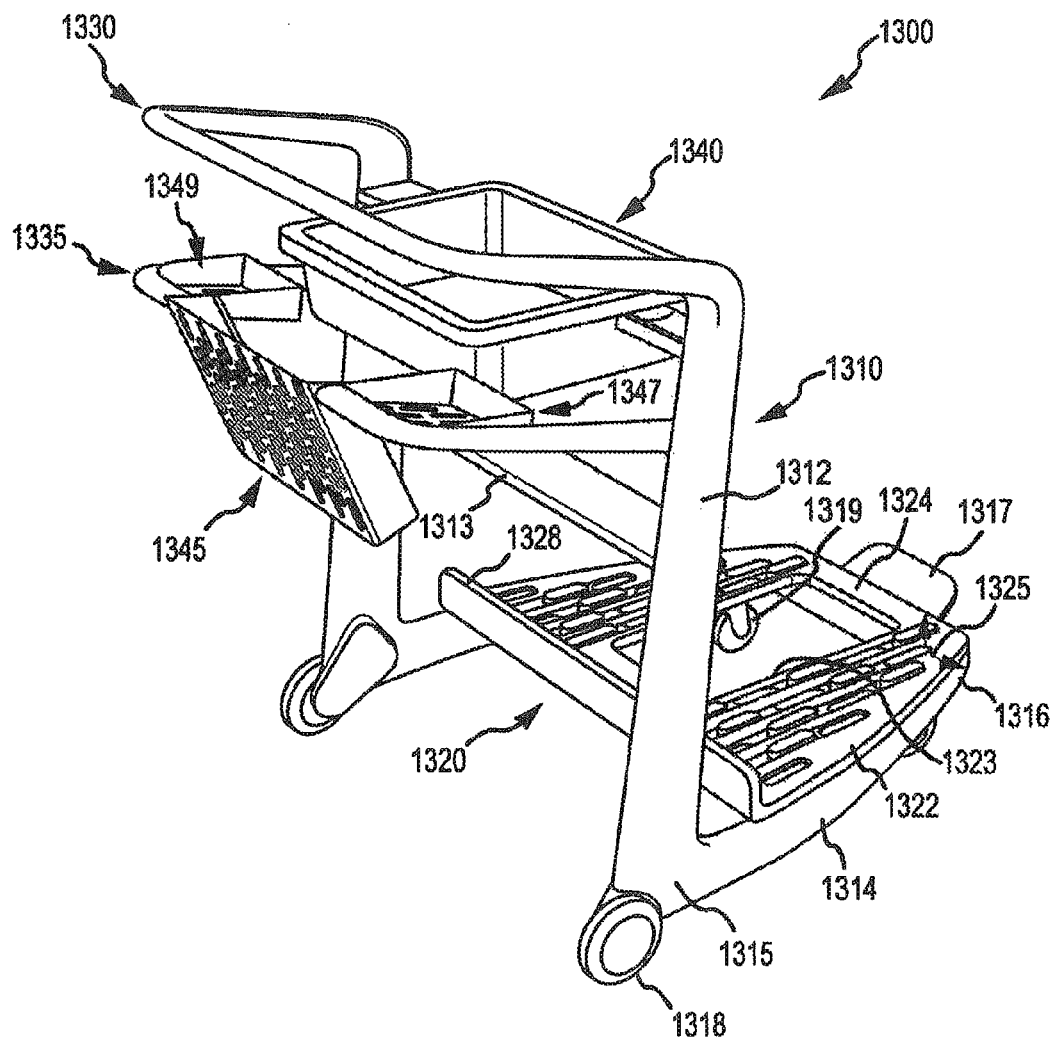

FIGS. 13 and 14 illustrate perspective front and rear side views of an airport divestment and luggage cart 1300 particularly suited for use with 3D scanners adapted for receiving the cart 1300 without removal of the bins (although some embodiments may utilize detachable bins as were provided for cart 100). As with the cart 100, the luggage cart 1300 includes a frame 1310 that includes a pair of spaced apart vertical supports 1312 that are rigidly attached at a lower end to a rear or back end 1315 of a lower horizontal support or tray receiving member 1314. Wheels in the form of a stationary pair 1318 and a pivotal or swivel-mounted pair 1319 are provided on an underside of the horizontal support 1314.

In cart 1300, a rigid bumper or lip 1317 is provided on the forward end 1316 of the support 1314 for retaining luggage or bags placed on a tray or shelf 1320. The luggage tray 1320 is pivotally mounted as shown with arrow 1325 at a forward arm or plate 1324 to the forward end 1316 of the support 1314. The body of the tray 1320 includes side arms or plates 1322 extending the length of the tray 1320 with an opening or groove 1323 provided between the side plates/arms 1322 for receiving a bumper 1317 of another cart 1300 during nested storage/staging of the carts 1300. The tray 1320 further includes a rear stop or bumper 1328 opposite the bumper 1317 for retaining luggage or bags placed on the tray 1320. In this way, too, the luggage is retained in a known horizontal position, e.g., a horizontal position within the cart 1300 that is forward of the bins to provide an unobstructed view of the bags or other items placed on the tray 1320 as well as an unobstructed view from below of any bins placed above or at higher vertical locations than bags on the tray 1320.

The cart 1300 differs from the cart 100 in that it avoids stacking of bins to provide a direct vertical and, in most cases, side and other angled view of the bins to facilitate 3D scanning of the bins on the cart 1300. The frame 1310 includes a strut 1313 between vertical supports 1312 and a pair of bin attachment members 1318, which are used to attach bin 1340 in a rigid manner or in a detachable manner. It may be useful to allow the larger bin 1340 to be removed for filling at a divestment station even in cases where the cart 1300 is passed in intact (with bins) through a scanner. The bin 1340 may be a relatively large rectangular-shaped bin as shown (e.g., similar to conventional airport security bins) to receive larger items such as shoes, liquid containers, and the like, and loose items such as coats/jackets removed from the passenger to pass through a metal detector.

As with cart 100, the bin 1340 is supported upon vertical supports 1312 so as to be in a horizontal position that is offset from all or a large portion of the tray 1320 such that an unobstructed view from above is provided of the tray 1320 and any bags placed on the tray 1320. As shown, the bin 1340 is positioned centrally between the two vertical supports near the top of the supports (e.g., between mounting locations for the two handles 1330, 1335) and extends rearward in a direction opposite to the tray 1320 (relative to the vertical supports 1312).

As with cart 100, dual handles are provided on the frame 1310 in the form of an upper handle 1330 and a lower handle 1335, both of which are rigidly affixed to and extend rearward from the vertical supports 1312. Significantly, the lower handle 1335 is configured to rigidly (or detachably in some embodiments) support several security or storage bins for use in placing personal or divested items. Particularly, the cart 1300 is shown to include a lower bin 1345 integral with the handle 1335 such as in the central portion of the handle 1335. This bin 1345 may be sized and shaped to receive a laptop or other similar full-sized electronic device that airport security typically requires be placed in a separate bin for scanning. The bin 1345 may be rectangular in shape and arranged vertically or at a steeper angle than bin 1340 to position the received laptop or electronic device on an end or angled upward rather than simply horizontal, which provides an unobstructed view but with a smaller footprint than if arranged horizontally as with bin 1340. The bin 1345 is shown to be wholly offset from the bin 1340 when viewed from above or below (e.g., the bins 1340, 1345 may appear to be adjacent or only slightly spaced apart when the cart is viewed in a plan view or from above).

The cart 1300 further includes smaller left and right side bins 1347, 1349 that are affixed to the lower handle 1335 (such as in the corners of the U-shaped handle 1335). These additional bins 1347, 1349 are also horizontally offset from bin 1340 as well as lower bin 1345 such that when the cart 1300 is viewed in a plan view or from above (or below) the upper bin 1340 does not overlap or block direct view of the bins 1347, 1349 and the bins 1347, 1349 do not overlap or block direct view of the lower bin 1345. In this manner, all four bins 1340, 1345, 1347, 1349 can readily be scanned with a 3D scanner configured to receive the cart 1300, e.g., on a conveyor belt or other cart transfer device adapted for engaging the cart 1300 and moving it through a scanner at a predefined rate.

Further, the frame 1310 including upper handle 1330 may be arranged to provide a limited obstruction or unobstructed view of the bins 1340, 1345, 1347, 1349 and tray 1320, and, to this end, the supports 1312 may be extend vertically upward from the horizontal support 1314 at the end 1315 at a location horizontally offset from back bumper 1328 of tray 1320 and the upper handle 1330 may be provided to be parallel to lower handle 1335 and over none or only an edge of lower bin 1345. As with the cart 100, the cart frame 1310 and the bins 1340, 1345, 1347, 1349 may each be formed of materials compatible with ready and effective scanning by a typical 3D airport security scanner. For example, the cart and bins may be formed of one or more plastics, ceramics, or other material.

Figure 15:
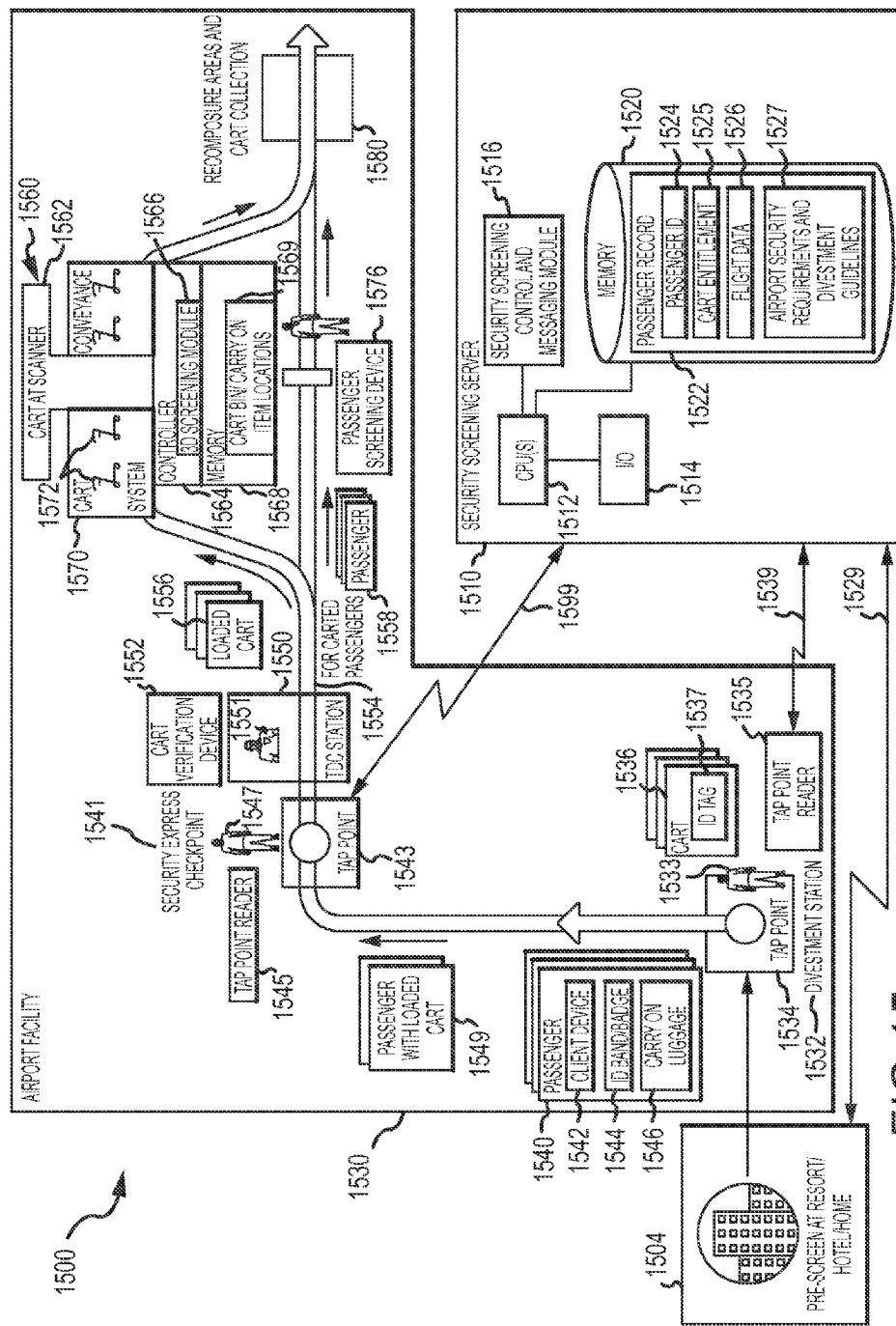
FIG. 15 is a functional block diagram of an airport security screening system of the present invention that combines airport divestment and luggage carts with scanner assemblies adapted for scanning the carts.
Figure 16:
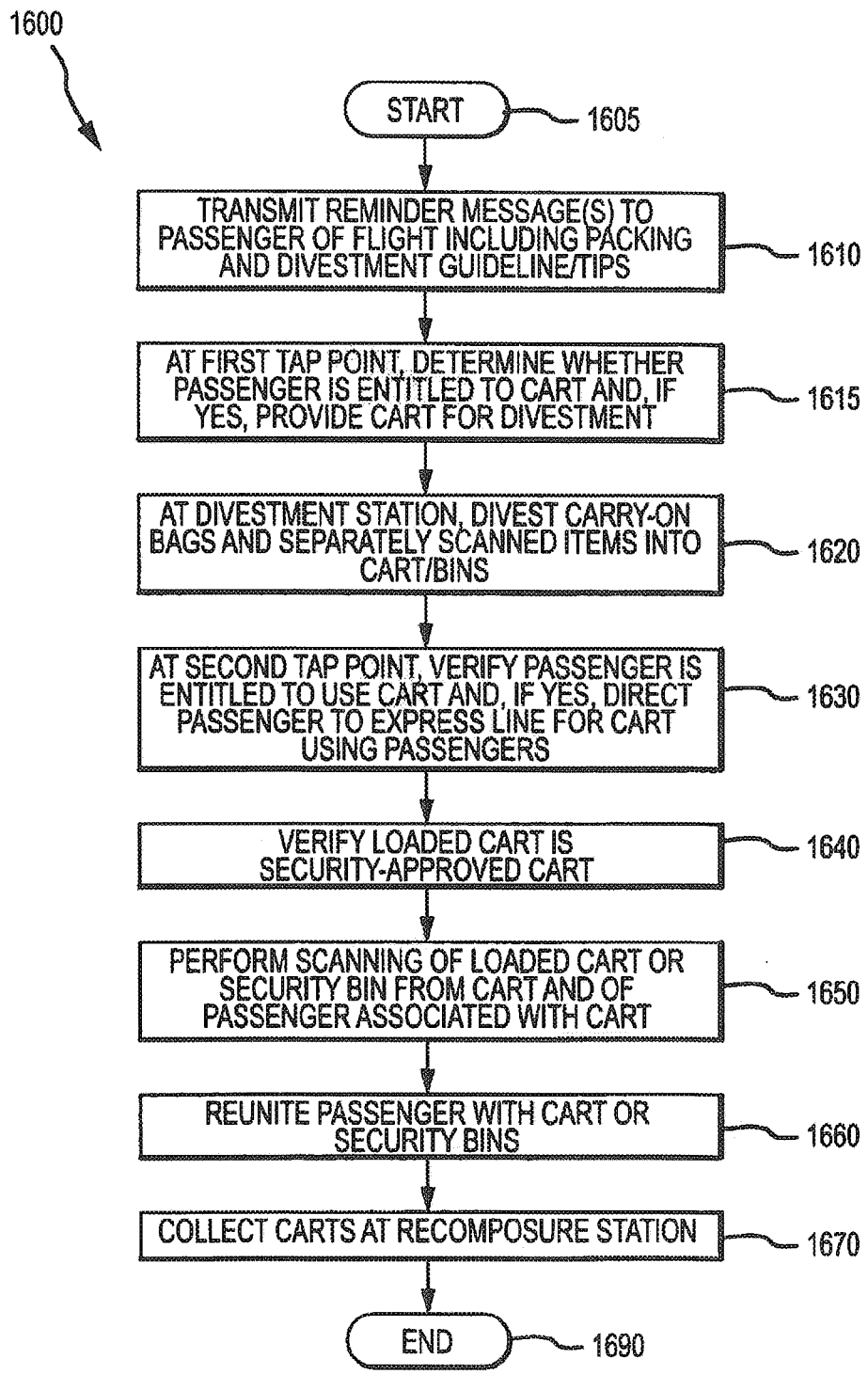
FIG. 16 is a flow diagram showing steps of an exemplary airport screening process as may be carried out by operation of the system of FIG. 15.

FIG. 15 illustrates an airport security screening system 1500 while FIG. 16 illustrates a security screening method 1600 that may be implemented by operation and use of the system 1500, and these two figures will be referred to concurrently in the following paragraphs to explain key aspects of the present invention.

The security screening system 1500 is shown to include an airport facility or concourse building 1530 in which a number of stations are provided for implementing steps of the divestment and security screening method 1600, and the system 1500 also includes a pre-screening station 1504 and a security screening or operations server (or server farm) 1510, both which may be provided outside of the airport facility 1530. The method 1600 may begin at 1605 by providing the security screening server 1510 for storing passenger records 1522 in memory 1520 and for communicating 1529, 1539, 1599 with the passengers and also with operators at stations in facility 1530 (or, more accurately, with wired or wireless communication devices operated by such passengers and operators). Further, an initial step 1605 of the method 1600 may include establishing the divestment station 1532 with the carts 1536 and other screening stations/areas such as the security express checkpoint 1541, modified security screening system 1560, and recomposure and cart collection station or area 1580. Configuration and operation of each of these components or parts of the system 1500 are described in detail in the following discussion.

The screening server 1510 may take the form of a server or server farm and may include one or more processors 1512 that run code/software that causes the server 1510 to carry out the functions described herein. Specifically, the CPU 1512 may execute a security screening control and messaging module 1516 to facilitate communications 1529, 1539, 1599. The server or computer system 1510 may include input/output (I/O) devices 1514 such as keyboards, a mouse, a touchpad, a touchscreen, and the like that allow an operator to provide input and initiate steps carried out by the server system 1510 through module 1516.

The server 1510 also includes memory 1520 that stores passenger records 1522 for each passenger 1540 passing through the illustrated security system 1500, and these records 1522 may include a passenger identifier/identification 1524 to facilitate lookup the passenger's records/data. The record 1522 may include a field indicating whether the passenger has a cart entitlement 1525, e.g., whether or not the passenger may check out a cart 1536 at an identity verification point (or tap point as shown in the FIG. 1534 of the divestment station 1532. The record 1522 may also include flight data 1526 for the passenger such that the module 1516 may operate to provide reminder messages or alerts 1529 to the passenger regarding an upcoming flight and its scheduled departure time. Further, the memory 1520 may be used to store airport security requirements and divestment guidelines 1527, which may be passed along in message 1529 to the passengers and which may be updated over time to facilitate the passengers complying with present or up-to-date rules for security screening (e.g., requirements regarding liquids may vary over time, removal of shoes for screening may change or vary airport-to-airport, and so on).

In some embodiments, the starting or initial step 1605 may also include providing the passenger (such as a resort guest) 1540 with a wearable band or badge or with an ID card or the like 1544 that may be used at security stations and/or identity verification points (or "tap points") to prove that the passenger 1540 has an entitlement such as to a cart 1536. For example, the wearable band or badge 1544 may include an RFID tag that is readable with a tap point or identity verification reader 1535 in the form of an RFID reader to obtain the passenger's ID that can then be used via communications 1539 with server 1510 to verify the passenger's entitlements 1525 with a passenger/badge ID value 1524 lookup in database or memory 1520. In some cases, the badge or ID band 1544 may also be used to provide an electronic boarding pass or airline ticket at a ticket document check (TDC) station 1554.

The method 1600 may continue at 1610 with generation and transmittal of a reminder message (e.g., an e-mail, a text message, or the like) to a passenger. For example, each passenger may use a client device (as shown with passengers 1540 at the airport facility 1530 carrying/using client devices 1542) to receive and access messages 1529 from screening server 1510. The passengers may receive the messages 1529 at pre-screening station or location 1504 such as at their home or at a resort or hotel. For example, a message 1529 may be transmitted to the passenger's e-mail address for access via the Internet or a text message may be sent to their cellphone, portable computing device, or similar wireless communication device 1542. The message provided at 1610 may provide a reminder of a flight time, a time for checking out of the hotel, and a time and location for boarding a shuttle vehicle.

Further, the message 1529 may indicate to the passenger 1540 that they have been signed up for use of an airport divestment and luggage cart 1536 at the airport facility 1530, and the message 1529 may provide the passenger 1540 with a location of the divestment station 1532 in the facility 1530 where they can pick up their cart 1536. In some embodiments, the message 1529 may also provide the passenger 1540 at the pre-screen station or location 1504 current security rules regarding packing their checked luggage and, more significantly, rules for carry-on luggage and personal items. For example, the module 1516 may determine from the flight data 1526 when to provide the reminding message 1529 regarding a flight and departure times and also at that time obtain current security requirements and divestment guidelines 1527 to provide fully or in part to the passenger 1540 in message 1529.

The tips/guidelines may include lists of items that cannot be carried on an aircraft and must be checked (or not taken at all) and a list of items that have to be removed from carry-on luggage or their person for separate scanning. The tips/guidelines may provide maximum dimensions for carry-on bags as well as the number allowed for free or for fee by the particular airline being used by the passenger. Further, cart-entitled passengers may be reminded that the cart will have bins designed for receiving/containing particular carry-on or personal items such as liquid containers, a laptop or electronic device designated by security requirements as needing separate screening, and the like. In this manner, the passenger is better able to perform pre-screening steps at their leisure at their home or hotel 1504 such as by limiting their liquids to containers of certain sizes (or putting them in bags that will be checked in rather than carried on) and placing their laptop or separately screened items in accessible locations in their carry-on bags.

The method 1600 continues at 1615 with the step of providing a passenger 1540 with an airport divestment and luggage cart 1536 and then with divestment 1620 prior to reaching a security checkpoint and screening queue. As shown in FIG. 15 after the pre-screen station 1504, passengers 1540 deport from a shuttle or other vehicle and enter the airport facility 1530 and approach a first check in or identity verification point 1534. The passenger 1540 may be carrying or wearing an ID band or badge 1544 that embeds travel information (or provides an ID that can be used to link them to a passenger record 1522 via field 1524) including whether they have a cart entitlement. The passenger 1540 may also be carrying a client device 1542 such as cellphone or other wireless or wired communication device (such as a laptop or portable computing device), and the client device 1542 may be used by the passenger 1540 to request that the server 1510 via module 1516 add a cart entitlement 1525 to their record 1522 and/or to request information 1526, 1527 to assist in their travels (such as location of divestment station 1532).

The divestment station 1532 includes a first identity verification 1534 of the system 1500, and an operator or travel assistant 1533 may use an identity verification reader 1535 (e.g., an RFID reader or the like) to determine whether the passenger 1540 has a cart entitlement. This may involve sending a query 1539 to the screening server with an ID from ID band 1544 and receiving a confirmation or denial message 1539 from the server 1510. When a cart entitlement is determined/confirmed, the operator 1533 may provide the passenger 1540 with an airport divestment and luggage cart 1536 (such as one of the embodiments described above with reference to the attached figures). The cart 1536 may have an ID tag 1537 (e.g., an RFID tag, a bar code decal/sticker, or the like) that can be used to confirm the cart 1536 is a security-approved cart useful with airport security scanners 1562. Further, the cart ID tag 1537 may be linked to the user/passenger 1540 in their record 1522 such that the cart 1536 and passenger 1540 may be linked at a security check point (e.g., at station 1540) or more readily reunited with their proper cart if ever separated in the airport facility 1530.

Significantly, the method 1600 includes the step 1620 of the passenger 1540 acting to load the cart 1536 with their carry-on bags/luggage and their separately scanned/scannable personal items. This loading or divestment step 1620 occurs at the divestment station 1532 which is separated some distance away from (or upstream in the airport screening process from) the security scanning queue or line. For example, the divestment station 1532 may be physically located near a point where passengers first enter the airport building 1530 such as prior to or immediately after an airline ticketing area.

Mobile divestment 1620 allows passengers 1540 to begin (or even finish in some cases) divestment before arriving at security. This may involve placing their carry-on bags on a lower, horizontal support of the cart 1536, removing their laptop or similar device from the carry-on bags and placing it in a dedicated or other cart bin, removing liquid containers and placing these in a bin, and so on. Passengers 1540 begin divestment in a calmer, less stressful environment such that they can arrive at security prepared for the security screening process. This promotes consistent flow by reducing security line holdups and congestion. As shown in FIG. 15, the passenger with their loaded cart 1549 may then continue through the airport facility 1530 transporting their carry-on items in conventional security bins supported on the cart or on a cart compatible for use with a security scanner without removal of bins, and either arrangement expedites the security scanning/inspection process.

The method 1600 continues at 1630 with a determination of whether the passenger is entitled to use the loaded cart and, if so, directing the passenger into an express (or dedicated) line or queue for carted passengers. This express line feeds a scanner 1562 that is designed and configured to scan the loaded carts 1536. In some cases, though, passengers 1549 may have a cart designed for use with a conventional scanner, and the express line may be eliminated or still be provided to these carted passengers because there use of the carts and earlier divestment at station 1532 significantly enhances screening speed and efficiency.

As shown in FIG. 15, a security express checkpoint or station 1541 may be provided in the system 1500. A passenger with a loaded cart 1549 presents their documents or ID band/badge 1544 to an operator/assistant 1547 at a second identity verification point 1543. The operator 1547 may use an identity verification reader 1545 (such as an RFID reader or the like) to determine the passenger's entitlements to the cart 1536 such as via communications 1599 with security screening server 1510 to have the module 1516 perform a passenger record 1522 lookup for entitlements 1525 for the passenger ID 1524 read at the identity verification 1543. If the cart entitlement is verified, the operator 1547 may further act to inspect the passenger's cart for proper or full divestment of their carry-on bags and/or separately scanned items into the bins on the cart. This may involve a visual inspection by assistant 1547 and/or a dialogue with the passenger making sure they are ready for security inspections and scanning. Once this "cart ready" check is complete, the assistant 1547 may direct them into an express scanning line or queue 1554 provided for carted or cart-using passengers.

The method 1600 continues at 1640 with verification that the passenger's loaded cart is one approved for use in the security system (can be scanned wholly or its bins can be scanned by a scanner 1562). The step 1640 typically will occur upstream of scanning devices but may be performed by the scanner itself during its 3D scanning (such as by providing an RFID reader in scanner 1562). As shown in FIG. 15, step 1640 may be carried out by the passenger 1549 presenting their paper or electronic documents, identification, and/or ID band/badge 1544 to security personnel 1551 at a ticket document check (TDC) station 1550. The security personnel 1551 may use a cart verification device 1552 to verify the cart 1549 is an authorized cart for use in the security system 1500. This may involve an RFID reader or other reader reading the ID tag 1537 on the cart 1549, and the completing a lookup or comparison process to ensure the cart ID is labeled with an identifier on an approved list or the like.

The method 1600 continues at 1650 with scanning of the loaded cart or the bins from the cart with a scanner while the passenger passes through a separate scanning/inspection device. As shown in FIG. 15, the system 1500 includes a scanning system 1560 that includes a cart scanner 1562 (or bin scanner in some embodiments) and a cart conveyance system 1570. The scanning system 1560 also may include a passenger scanning device 1576 (e.g., a metal detector or the like). In practice, after the TDC station 1550, the passenger 1558 places their loaded cart 1556 on a conveyor or inlet portion of the cart conveyance system 1570 and passes separately through the passenger screening device 1576.

The carts 1556 are moved as shown with carts 1572 through the security scanner 1562 with an automatic conveyance system 1570 that may be application specific (e.g., designed to suit a particular scanner 1562 and/or cart 1556). In some preferred embodiments, the carts 1556 do not have to be unloaded (e.g., bins removed) but can be passed whole (e.g., in an upright orientation) as shown at 1572 through the scanner 1562 for 3D or other scanning (which is known in security/scanning arts). For example, the conveyance system 1570 may include a conveyor belt that engages a portion of the carts 1572 to cause them to roll with the moving belt through the scanner 1562 such as by rolling on the cart wheels or being lifted off the cart wheels to rest on the moving belt.

To assist the scanning at 1650, the scanning system 1560 may include a controller 1564 operating the cart scanner 1562 to scan the cart and its contents. Scanning is facilitated by a 3D screening module 1566 (code/software/programming run by a processor of the controller 1564) that accesses memory 1568 to retrieve the cart configuration including cart bin and carry-on locations 1569, and this information is utilized to assist an operator of the scanner 1562 in interpreting the results of the 3D scan (or images on a display of the scanner 1562). For example, the carts 1572 may have a known location for carry-on bags and a bin dedicated for particular personal items such as a laptop and liquid containers. Then, the scanning software 1566 may alert an operator when an item (such as a laptop) is detected in a different location (such as still in a carry-on bag).

The known locations of the cart bins and luggage supports also allows the operator to more quickly recognize what they are observing without requiring as many belt stops and repeated scans. In most cases, the cart is designed to be of all ceramic/plastic construction as this allows the 3D scanner 1562 to "see" through the cart to items in its bins and to scan carry-on luggage placed on the cart. Also, as discussed above, the cart is configured to provide completely or nearly completely unblocked (no overlap of bins or cart components with the luggage (from above and from sides) and the bins (at least from above and often from the side(s)). Stacking of the bins may be used in carts where the bins and/or cart frame are passed separately through a conventional airport security scanner.

The method 1600 continues at 1660 with the passenger being reunited with their loaded cart (or bins from the disassembled cart in some cases). This also improves the efficiency of the screening process as there is less congestion or blockage at the outlet of the scanners 1562 and personal screener device 1576, as the passenger 1558 can simply collect their cart 1556 at the outlet of the scanner 1562 and continue to push it out of the security checkpoint and scanning area. In some airports, the passenger may have to put on their shoes, but they will not have to repack their carry-on luggage and put their separately scanned items away at the back end of the scanner 1562.

Instead, the method 1600 continues at 1670 with collection of the carts at a recomposure station. The system 1500 is shown to include a recomposure station 1580 that is spaced apart at least some distance from the outlet of the scanner 1562. This may be an area with benches or other places to sit that is near the security checkpoint outlet (such as immediately outside of the security inspection area or offset some distance from this checkpoint). The passengers can repack their bags and put their scanned items away at their own pace or in a much more leisurely manner than now occurs in airports where exiting security can be nearly as stressful and rushed as divesting or preparing for scanning. The emptied carts can then be nested together for temporary storage prior to return to a divestment station 1532. In some cases, the passenger may be able to retain their cart much longer such as by providing multiple recomposure and cart collection stations 1580 in the facility 1530 such as one at each airside gate or one for each airline or the like. The method 1600 then ends at 1690.

As discussed above, some preferred embodiments provide a cart and scanner combination that allows the divestment and luggage cart to be loaded and then be conveyed when loaded through the scanner. In such embodiments, the security bins do not have to be removed from the cart. Further, the luggage cart does not have to be disassembled or even collapsed for it to pass through the scanner, e.g., the cart frame is rigid and may even be a unitary construction.

Also, in some preferred embodiments, the conveyance system is adapted such that the cart remains upright such that the bin contents are retained in place or as loaded by the passengers. In such cases, the conveyance system may engage a portion or surface of the cart (such as a lower surface of the horizontal support element or luggage support tray/shelf) and roll the cart on its wheels through the scanner or raise it a small distance (e.g., less than a 3 inches such as less than about 1 inch) such as to ride on a conveyor or security screening belt. This belt may also be used for oversized items such as baby strollers or the like that can be placed directly on the belt or first placed in a security bin that, in turn, can be placed on the belt.

Figure 17:
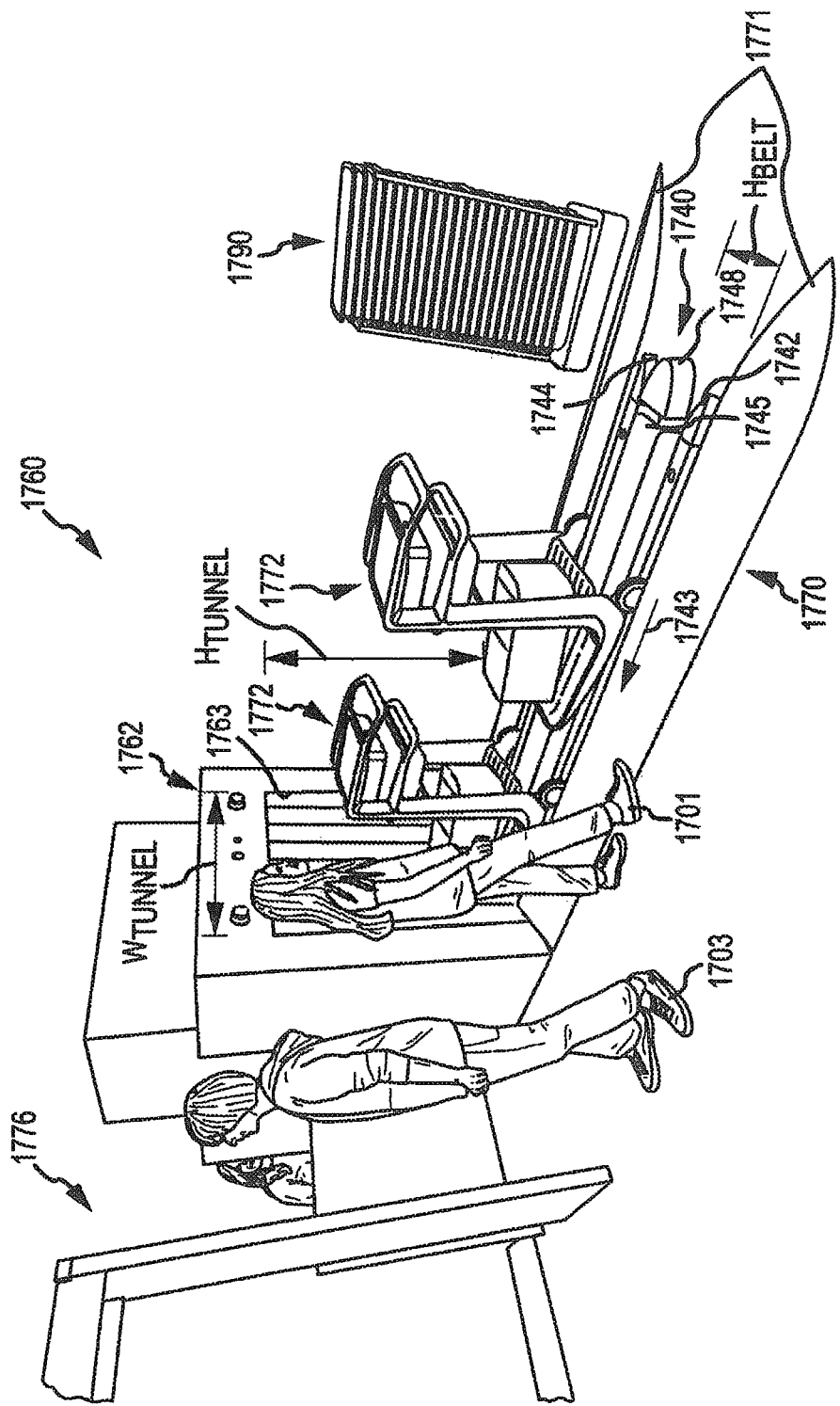
FIG. 17 illustrates a portion of an airport security checkpoint including a cart scanning system in which loaded airport divestment and luggage carts of the present invention are being fed by a cart conveyance assembly or system described herein.
Figure 18:
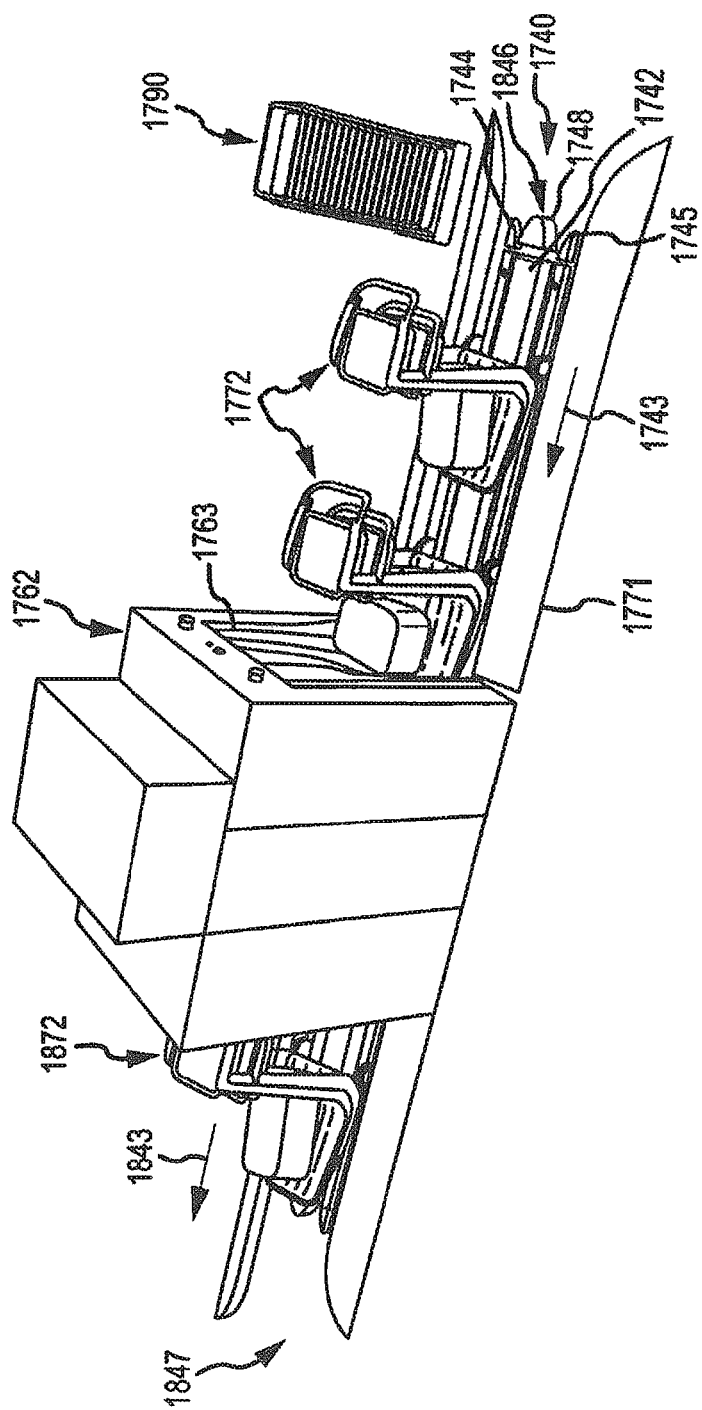
FIG. 18 illustrates more fully a side perspective view of the cart scanning system of FIG. 17 showing carts being transported through the cart scanner in the upright position and, in this example, rolling upon the cart's wheels (although this may not be the case in some preferred embodiments in which the cart will ride fully upon the conveyor belt of the conveyance assembly)
Figure 19:
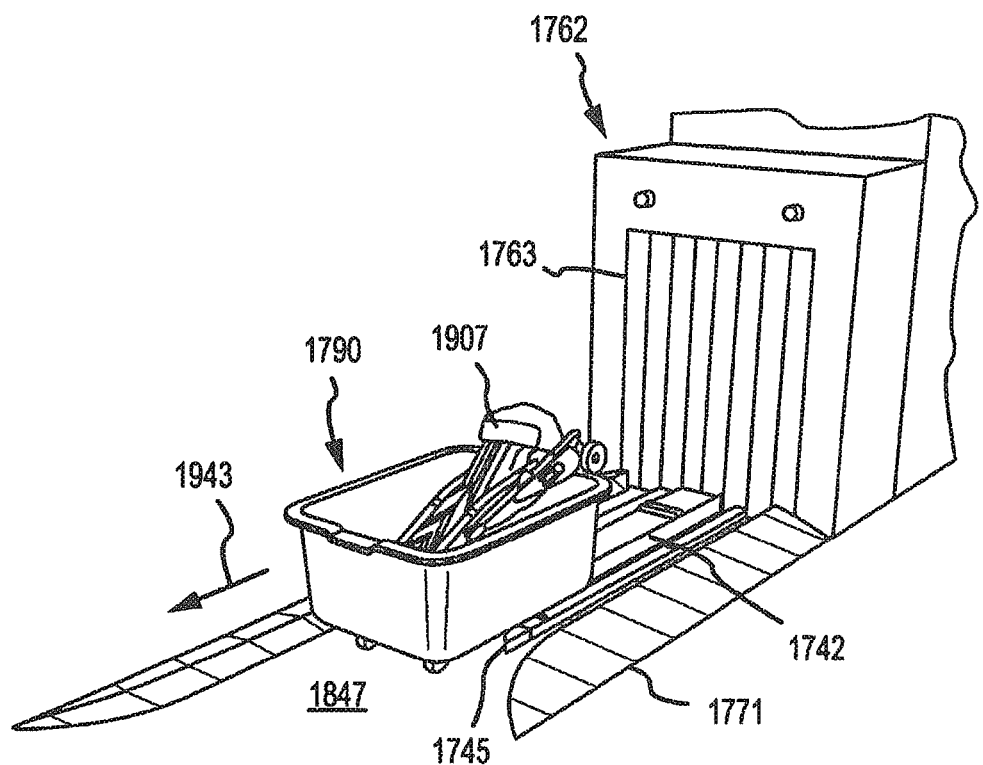
FIG. 19 illustrates that larger or irregular-sized carry-on items may be passed through the scanning system of FIGS. 17 and 18 through the use of large security bins provided at the cart loading or scanner input area, that are placed directly upon the conveyor belt.

FIGS. 17-19 illustrate an exemplary security screening system 1760 that may be utilized to improve airport security inspections and the checkpoint throughput. As shown, the screening system 1760 includes a cart scanner 1762 that is adapted for at least 2D scanning of luggage and personal items but more typically for 3D scanning as is performed presently with airport security scanners. In contrast, though, to present scanners, the scanner 1762 includes a tunnel 1763 (and associated scanning equipment not shown) that is adapted for receiving loaded carts 1772. Specifically, the tunnel 1763 of the scanner 1762 may have dimensions to receive the carts 1772 in an upright orientation such as with a rectangular shape with a height, $H_{Tunnel}$, and a width, $W_{Tunnel}$, that are both greater than matching dimensions of the loaded cart 1772 (e.g., 40 to 50 inches in height by 20 to 30 inches in width).

A cart conveyance system 1770 is provided with a pair of spaced-apart and raised safety curbs 1771 defining a cart loading area 1846 (or inlet to the conveyance system 1770) and keeping passengers 1701 dropping off carts 1772 from walking onto the conveyor belt 1742. The conveyance system 1770 may take many designs to function to convey 1743 through the scanner 1762 via tunnel 1763. As shown, the conveyance system 1770 includes a conveyor belt assembly 1740 that has a central belt 1742 that engages a lower surface of the horizontal supports and/or luggage trays of the loaded carts 1772 causing the carts 1772 to move 1743 with the belt 1742.

The belt 1742 may have a width that is less than the spacing between both pairs of wheels and has a height, $H_{Belt}$, that matches the height of the lower surface of the horizontal support or luggage tray (in some cases) of the cart so as to engage the cart 1772. The belt height, $H_{Belt}$, may substantially match that of the lower surfaces of the cart frame so that the carts 1772 continue to roll on their wheels with movement/transporting 1743 or the belt height, $H_{Belt}$, may be greater to cause the wheels to be spaced apart from the floor and the carts 1772 to be fully supported by the belt 1742 (e.g., with a ramp (not shown) provided to roll the carts 1772 up onto the raised upper surface of the belt 1742). The conveyor belt assembly 1740 may include a central guide 1748 with curved surfaces to guide the front wheels into tracks/grooves adjacent the belt 1742, and the grooves or guide slots may be defined by right and left cart wheel guide rails 1744, 1745 that run along the length of the conveyor belt 1742.

Once a passenger 1701 (or an airport security representative) engages their cart 1772 with the conveyance system 1770, they may move on for personal screening via screening device 1776 as shown for passenger 1703. As shown in FIG. 18, each passenger can then reunite with carts 1872 that are moved 1843 out of the scanner 1762 and its tunnel 1763 to a cart retrieval area 1847. In the area 1847, the cart 1872 rolls off of the end of the conveyor belt 1742 and disengages or is released from the belt 1742 and conveyance system 1770. At this point, a passenger may move their loaded cart 1872 to a recomposure area for repacking of items into the carry-on luggage and return the cart for use by other passengers.

In addition to scanning of carts 1772, 1872, the scanner 1762 may be used to scan other items. For example, the scanning system 1760 may provide additional security bins 1790, and these may be used by passengers to pass oversized items such as baby strollers 1907 and the like that are not loaded onto the carts 1772, 1872. These bins 1790 may be placed directly on the moving belt 1742 and later retrieved from the moving 1943 belt 1742 in the cart retrieval area 1847.

Although the invention has been described and illustrated with a certain degree of particularity, it is understood that the present disclosure has been made only by way of example, and that numerous changes in the combination and arrangement of parts can be resorted to by those skilled in the art.

We claim:

1. A system for use in performing airport security screening, comprising:
    a plurality of airport divestment and luggage carts, each of the carts comprising a frame with a lower support for receiving carry-on luggage, the frame further supporting at least one bin for receiving separately scannable items;
    a scanner for performing 3D security scanning of items passed through a scanning tunnel; and
    a conveyance system for engaging each of the carts and transporting the carts through the scanning tunnel for 3D scanning of the carts including the carry-on luggage and the separately scannable items in the at least one bin,
    wherein the scanner includes a controller running a screening module performing functions during the 3D scanning and
    wherein the screening module performs the functions based on retrieved cart configuration information including 3D locations of the at least one bin and the lower support.

2. The system of claim 1, wherein the frame of each of the carts is formed of one or more non-metallic materials and is non-collapsible and wherein the carts are oriented upright during transportation through the scanner.

3. The system of claim 2, wherein a set of wheels are provided on the frame of each of the carts and wherein the conveyance system includes a conveyor belt for contacting a lower surface of the frame such that the cart rolls on the wheels through the scanning tunnel.

4. The system of claim 1, wherein the cart frame and the at least one bin are arranged to provide unobstructed views to the scannable items and the carry-on luggage at least from above and at least one side as the cart is transported through the scanner.

5. The system of claim 1, wherein the frame includes a set of wheels attached to a lower surface of the lower support, a luggage tray attached to an upper surface of the lower support, and at least one vertical support extending upward from the lower horizontal support, wherein the at least one bin comprises an open-topped storage bin mounted to the vertical support to extend rearward away from the vertical support and luggage tray, whereby an open space is provided above the luggage tray.

6. The system of claim 5, wherein the cart further comprises upper and lower handles extending outward from the vertical support and away from the luggage tray, wherein the cart further includes at least one storage bin attached to the lower handle, and wherein the bins are horizontally offset from each other and the luggage tray such that in a plan view there is no overlap between the bins and between the bins and the luggage tray.

7. A system for use in performing airport security screening, comprising:
    a plurality of airport divestment and luggage carts, each of the carts comprising a frame with a lower support for receiving carry-on luggage, the frame further supporting at least one bin for receiving separately scannable items;
    a scanner for performing 3D security scanning of items passed through a scanning tunnel; and
    a conveyance system for engaging each of the carts and transporting the carts through the scanning tunnel for 3D scanning of the carts including the carry-on luggage and the separately scannable items in the at least one bin,
    wherein the carts are oriented upright during transportation through the scanner,
    wherein the scanner includes a controller running a screening module performing functions during the 3D scanning, and
    wherein the screening module performs the functions based on retrieved cart configuration information including 3D locations of the at least one bin and the lower support.

8. The system of claim 7, wherein the frame of each of the carts is formed of one or more non-metallic materials and is non-collapsible.

9. The system of claim 7, wherein a set of wheels are provided on the frame of each of the carts and wherein the conveyance system includes a conveyor belt for contacting a lower surface of the frame such that the cart rolls on the wheels through the scanning tunnel.

10. The system of claim 7, wherein the cart frame and the at least one bin are arranged to provide unobstructed views to the scannable items and the carry-on luggage at least from above and at least one side as the cart is transported through the scanner.

11. The system of claim 7, wherein the frame includes a set of wheels attached to a lower surface of the lower support, a luggage tray attached to an upper surface of the lower support, and at least one vertical support extending upward from the lower horizontal support, wherein the at least one bin comprises an open-topped storage bin mounted to the vertical support to extend rearward away from the vertical support and luggage tray, whereby an open space is provided above the luggage tray.

12. The system of claim 11, wherein the cart further comprises upper and lower handles extending outward from the vertical support and away from the luggage tray, wherein the cart further includes at least one storage bin attached to the lower handle, and wherein the bins are horizontally offset from each other and the luggage tray such that in a plan view there is no overlap between the bins and between the bins and the luggage tray.

13. A system for use in performing airport security screening, comprising:
    a plurality of airport divestment and luggage carts, each of the carts comprising a frame with a lower support for receiving carry-on luggage, the frame further supporting at least one bin for receiving separately scannable items;
    a scanner for performing 3D security scanning of items passed through a scanning tunnel; and
    a conveyance system for engaging each of the carts and transporting the carts through the scanning tunnel for 3D scanning of the carts including the carry-on luggage and the separately scannable items in the at least one bin, wherein the frame includes a set of wheels attached to a lower surface of the lower support, a luggage tray attached to an upper surface of the lower support, and at least one vertical support extending upward from the lower horizontal support, wherein the at least one bin comprises an open-topped storage bin mounted to the vertical support to extend rearward away from the vertical support and luggage tray, whereby an open space is provided above the luggage tray, wherein the cart further comprises upper and lower handles extending outward from the vertical support and away from the luggage tray, wherein the cart further includes at least one storage bin attached to the lower handle, and wherein the bins are horizontally offset from each other and the luggage tray such that in a plan view there is no overlap between the bins and between the bins and the luggage tray.

14. The system of claim 13, wherein the frame of each of the carts is formed of one or more non-metallic materials and is non-collapsible and wherein the carts are oriented upright during transportation through the scanner.

15. The system of claim 14, wherein a set of wheels are provided on the frame of each of the carts and wherein the conveyance system includes a conveyor belt for contacting a lower surface of the frame such that the cart rolls on the wheels through the scanning tunnel.

16. The system of claim 13, wherein the cart frame and the at least one bin are arranged to provide unobstructed views to the scannable items and the carry-on luggage at least from above and at least one side as the cart is transported through the scanner.

17. The system of claim 16, wherein the cart further comprises upper and lower handles extending outward from the vertical support and away from the luggage tray, wherein the cart further includes at least one storage bin attached to the lower handle, and wherein the bins are horizontally offset from each other and the luggage tray such that in a plan view there is no overlap between the bins and between the bins and the luggage tray.

18. A system for use in performing airport security screening, comprising:
a plurality of airport divestment and luggage carts, each of the carts comprising a frame with a lower support for receiving carry-on luggage, the frame further supporting at least one bin for receiving separately scannable items;
a scanner for performing 3D security scanning of items passed through a scanning tunnel; and
a conveyance system for engaging each of the carts and transporting the carts through the scanning tunnel for 3D scanning of the carts including the carry-on luggage and the separately scannable items in the at least one bin,
wherein the frame includes a set of wheels attached to a lower surface of the lower support, a luggage tray attached to an upper surface of the lower support, and at least one vertical support extending upward from the lower horizontal support,
wherein the at least one bin comprises an open-topped storage bin mounted to the vertical support to extend rearward away from the vertical support and luggage tray, whereby an open space is provided above the luggage tray, and
wherein the cart further comprises upper and lower handles extending outward from the vertical support and away from the luggage tray, wherein the cart further includes at least one storage bin attached to the lower handle, and
wherein the bins are horizontally offset from each other and the luggage tray such that in a plan view there is no overlap between the bins and between the bins and the luggage tray.

19. The system of claim 18, wherein the frame of each of the carts is formed of one or more non-metallic materials and is non-collapsible and wherein the carts are oriented upright during transportation through the scanner.

20. The system of claim 19, wherein a set of wheels are provided on the frame of each of the carts and wherein the conveyance system includes a conveyor belt for contacting a lower surface of the frame such that the cart rolls on the wheels through the scanning tunnel.

21. The system of claim 18, wherein the cart frame and the at least one bin are arranged to provide unobstructed views to the scannable items and the carry-on luggage at least from above and at least one side as the cart is transported through the scanner.

22. A system for use in performing airport security screening, comprising:
a plurality of airport divestment and luggage carts, each of the carts comprising a frame with a lower support for receiving carry-on luggage, the frame further supporting at least one bin for receiving separately scannable items;
a scanner for performing 3D security scanning of items passed through a scanning tunnel; and
a conveyance system for engaging each of the carts and transporting the carts through the scanning tunnel for 3D scanning of the carts including the carry-on luggage and the separately scannable items in the at least one bin,
wherein the carts are oriented upright during transportation through the scanner,
wherein the frame includes a set of wheels attached to a lower surface of the lower support, a luggage tray attached to an upper surface of the lower support, and at least one vertical support extending upward from the lower horizontal support,
wherein the at least one bin comprises an open-topped storage bin mounted to the vertical support to extend rearward away from the vertical support and luggage tray, whereby an open space is provided above the luggage tray,
wherein the cart further comprises upper and lower handles extending outward from the vertical support and away from the luggage tray,
wherein the cart further includes at least one storage bin attached to the lower handle, and
wherein the bins are horizontally offset from each other and the luggage tray such that in a plan view there is no overlap between the bins and between the bins and the luggage tray.

23. The system of claim 22, wherein the frame of each of the carts is formed of one or more non-metallic materials and is non-collapsible.

24. The system of claim 22, wherein a set of wheels are provided on the frame of each of the carts and wherein the conveyance system includes a conveyor belt for contacting a lower surface of the frame such that the cart rolls on the wheels through the scanning tunnel.

25. The system of claim 22, wherein the cart frame and the at least one bin are arranged to provide unobstructed views to the scannable items and the carry-on luggage at least from above and at least one side as the cart is transported through the scanner.

26. A system for use in performing airport security screening, comprising:

a plurality of airport divestment and luggage carts, each of the carts comprising a frame with a lower support for receiving carry-on luggage, the frame further supporting at least one bin for receiving separately scannable items;

a scanner for performing 3D security scanning of items passed through a scanning tunnel; and a conveyance system for engaging each of the carts and transporting the carts through the scanning tunnel for 3D scanning of the carts including the carry-on luggage and the separately scannable items in the at least one bin, wherein the frame includes a set of wheels attached to a lower surface of the lower support, a luggage tray attached to an upper surface of the lower support, and at least one vertical support extending upward from the lower horizontal support, wherein the at least one bin comprises an open-topped storage bin mounted to the vertical support to extend rearward away from the vertical support and luggage tray, whereby an open space is provided above the luggage tray, wherein the cart further comprises upper and lower handles extending outward from the vertical support and away from the luggage tray, wherein the cart further includes at least one storage bin attached to the lower handle, and wherein the bins are horizontally offset from each other and the luggage tray such that in a plan view there is no overlap between the bins and between the bins and the luggage tray.

27. The system of claim 26, wherein the frame of each of the carts is formed of one or more non-metallic materials and is non-collapsible and wherein the carts are oriented upright during transportation through the scanner.

28. The system of claim 27, wherein a set of wheels are provided on the frame of each of the carts and wherein the conveyance system includes a conveyor belt for contacting a lower surface of the frame such that the cart rolls on the wheels through the scanning tunnel.

29. The system of claim 26, wherein the cart frame and the at least one bin are arranged to provide unobstructed views to the scannable items and the carry-on luggage at least from above and at least one side as the cart is transported through the scanner.

* * * * *